(12) United States Patent
Lee

(10) Patent No.: US 11,525,485 B1
(45) Date of Patent: Dec. 13, 2022

(54) AXLE DISCONNECT ASSEMBLY WITH BLOCKED MODE TRANSITION

(71) Applicant: Schaeffler Technologies AG & Co. KG, Herzogenaurach (DE)

(72) Inventor: Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/406,180

(22) Filed: Aug. 19, 2021

(51) Int. Cl.
*F16D 11/10* (2006.01)
*F16D 125/64* (2012.01)
*F16D 125/40* (2012.01)
*F16D 23/12* (2006.01)

(52) U.S. Cl.
CPC ........ *F16D 11/10* (2013.01); *F16D 2023/123* (2013.01); *F16D 2125/40* (2013.01); *F16D 2125/64* (2013.01); *F16D 2200/0021* (2013.01)

(58) Field of Classification Search
CPC ............... F16D 11/10; F16D 2023/123; F16D 2125/40; F16D 2125/64; F16D 2200/0021
See application file for complete search history.

(56) References Cited

U.S. PATENT DOCUMENTS 9,784,355 B1 * 10/2017 Brammer ................ F16H 48/24
2019/0309804 A1 * 10/2019 Shibata ................... F16H 48/38

* cited by examiner

*Primary Examiner* — David J Hlavka
(74) *Attorney, Agent, or Firm* — Volpe Koenig

(57) ABSTRACT

An axle disconnect assembly, including: a housing; a shaft; a sleeve non-rotatably connected to the shaft and including teeth; a shift assembly; and at least one resilient element directly connected to the shift assembly. In a first blocked mode, the teeth of the sleeve contact the power output without meshing with teeth of the power output, the shift assembly deflects the at least one resilient element to at least one first shape, and the at least one resilient element urges the sleeve against the power output. In a second blocked mode, the teeth of the sleeve are meshed with the teeth of the power output, a force blocks disengagement of the sleeve from the power output, the shift assembly deflects the at least one resilient element to at least one second, and the at least one resilient element urges the sleeve away from the power output without displacing the sleeve.

20 Claims, 22 Drawing Sheets

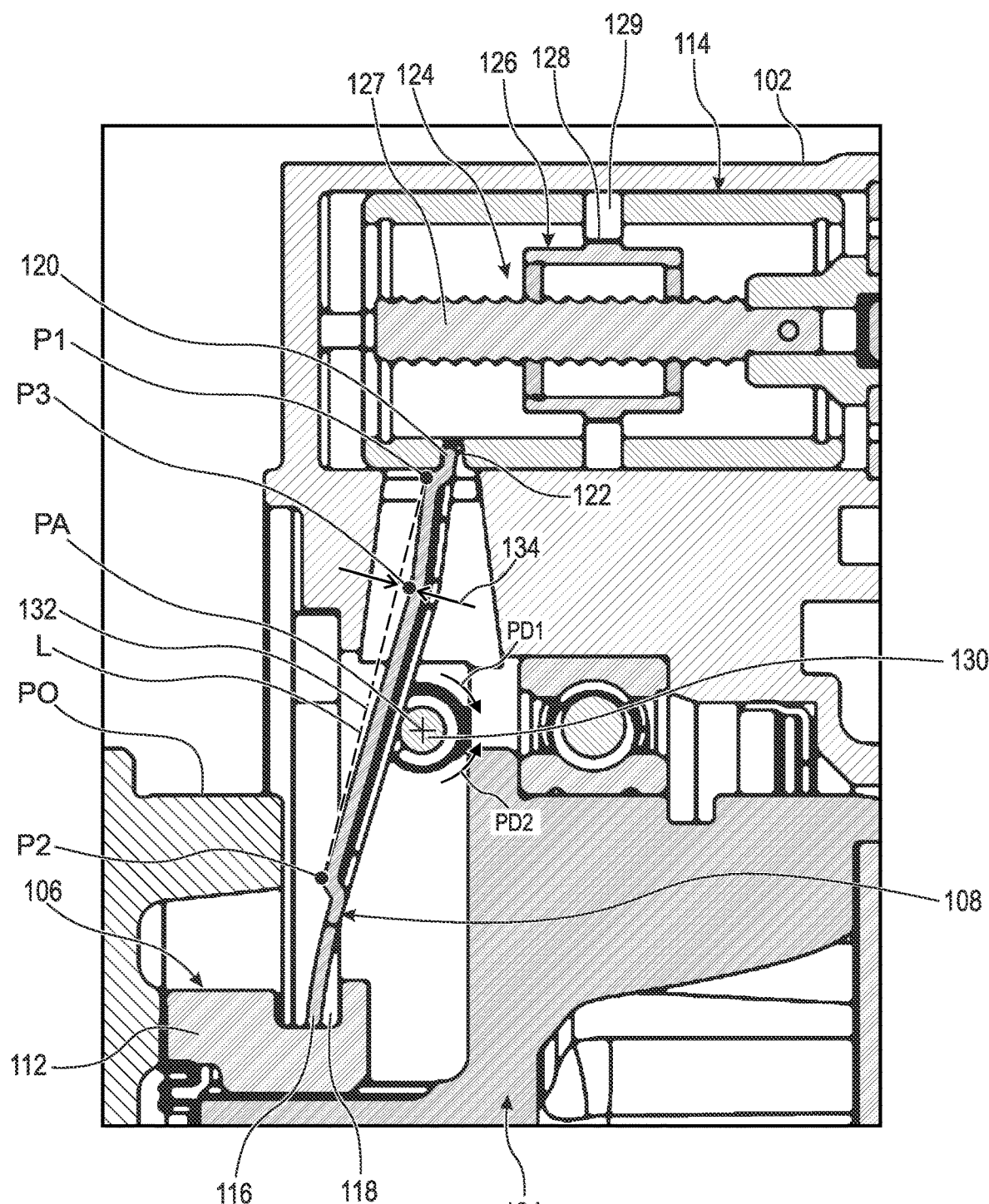
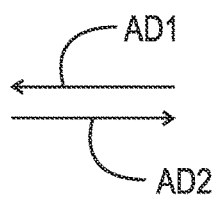
Fig. 8

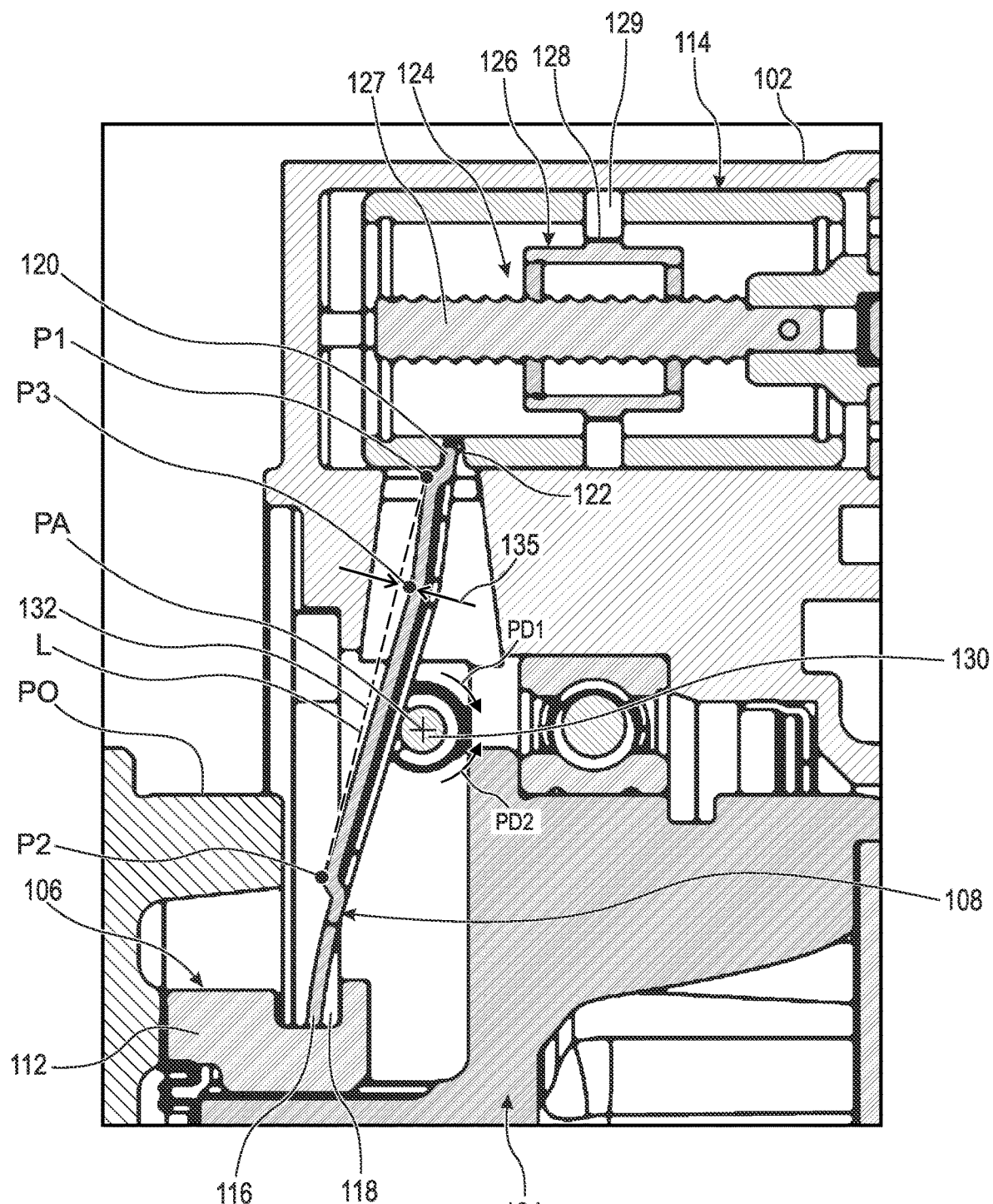
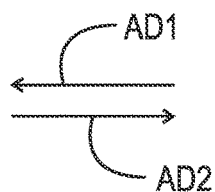
Fig. 9

AXLE DISCONNECT ASSEMBLY WITH BLOCKED MODE TRANSITION

TECHNICAL FIELD

The present disclosure relates to an axle disconnect assembly enabled for transition out of multiple blocked modes.

BACKGROUND

Operation of known disconnect assemblies can be blocked by torque on components or misalignment of components.

SUMMARY

According to aspects illustrated herein, there is provided an axle disconnect assembly, including: a housing; a main shaft; a sleeve arranged to receive a rotational torque from a power output, the sleeve non-rotatably connected to the main shaft, axially displaceable with respect to the main shaft, and including a plurality of teeth; a shift assembly; and at least one resilient element directly connected to the shift assembly. In a first blocked mode, the plurality of teeth of the sleeve is arranged to contact the power output without meshing with a plurality of teeth of the power output, the shift assembly is arranged to deflect the at least one resilient element to at least one first shape, and the at least one resilient element is arranged to urge the sleeve against the power output. In a second blocked mode, the plurality of teeth of the sleeve is arranged to mesh with the plurality of teeth of the power output, a force is arranged to block disengagement of the sleeve from the power output, the shift assembly is arranged to deflect the at least one resilient element to at least one second shape different from the first shape, and the at least one resilient element is arranged to urge the sleeve away from the power output without displacing the sleeve.

According to aspects illustrated herein, there is provided an axle disconnect assembly, including: a housing; a main shaft at least partly enclosed by the housing; a sleeve arranged to receive rotational torque from a power output, the sleeve non-rotatably connected to the main shaft, axially displaceable with respect to the main shaft, and including a plurality of teeth; a shift assembly; and a resilient shift lever made of a resilient material and including a first end directly connected to the sleeve and a second end directly connected to the shift assembly. When the resilient material is deflected or bent from a free or unloaded state, the resilient material returns to the free state or unloaded state, without permanent deformation, when a load deflecting or bending the material is removed. In a first blocked mode, the plurality of teeth is arranged to be in contact with the power output without meshing with the plurality of teeth of the power output and the shift assembly is arranged to bend the resilient shift lever to a first shape. In a second blocked mode, the plurality of teeth of the sleeve is arranged to mesh with the plurality of teeth of the power output, a force is arranged to block disengagement of the sleeve from the power output, the shift assembly is arranged to bend the resilient shift lever to a second shape different from the first shape, and the resilient shift lever is arranged urge the sleeve away from the power output without displacing the sleeve.

According to aspects illustrated herein, there is provided an axle disconnect assembly, including: a housing; a main shaft at least partly enclosed by the housing; a sleeve arranged to receive rotational torque from a power output, the sleeve non-rotatably connected to the main shaft, axially displaceable with respect to the main shaft, and including a plurality of teeth; a shift assembly including a first resilient element and a second resilient element; and a shift lever including a first end directly connected to the sleeve and a second end directly connected to the shift assembly. In a first blocked mode, the plurality of teeth of the sleeve is arranged to be in contact with the power output without meshing with the plurality of teeth of the power output, the first resilient element is arranged to urge the shift lever in a first pivot direction with respect to the housing, and the shift lever is arranged to urge the sleeve against the power output. In a second blocked mode, the plurality of teeth of the sleeve is arranged to mesh with the plurality of teeth of the power output, a force is arranged to block disengagement of the sleeve from the power output, and the shift lever is arranged to urge the sleeve away the power output without displacing the sleeve.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 8 is a detail of area 8/9 in FIG. 4;

FIG. 9 is a detail of area 8/9 in FIG. 4 in a second connect mode;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
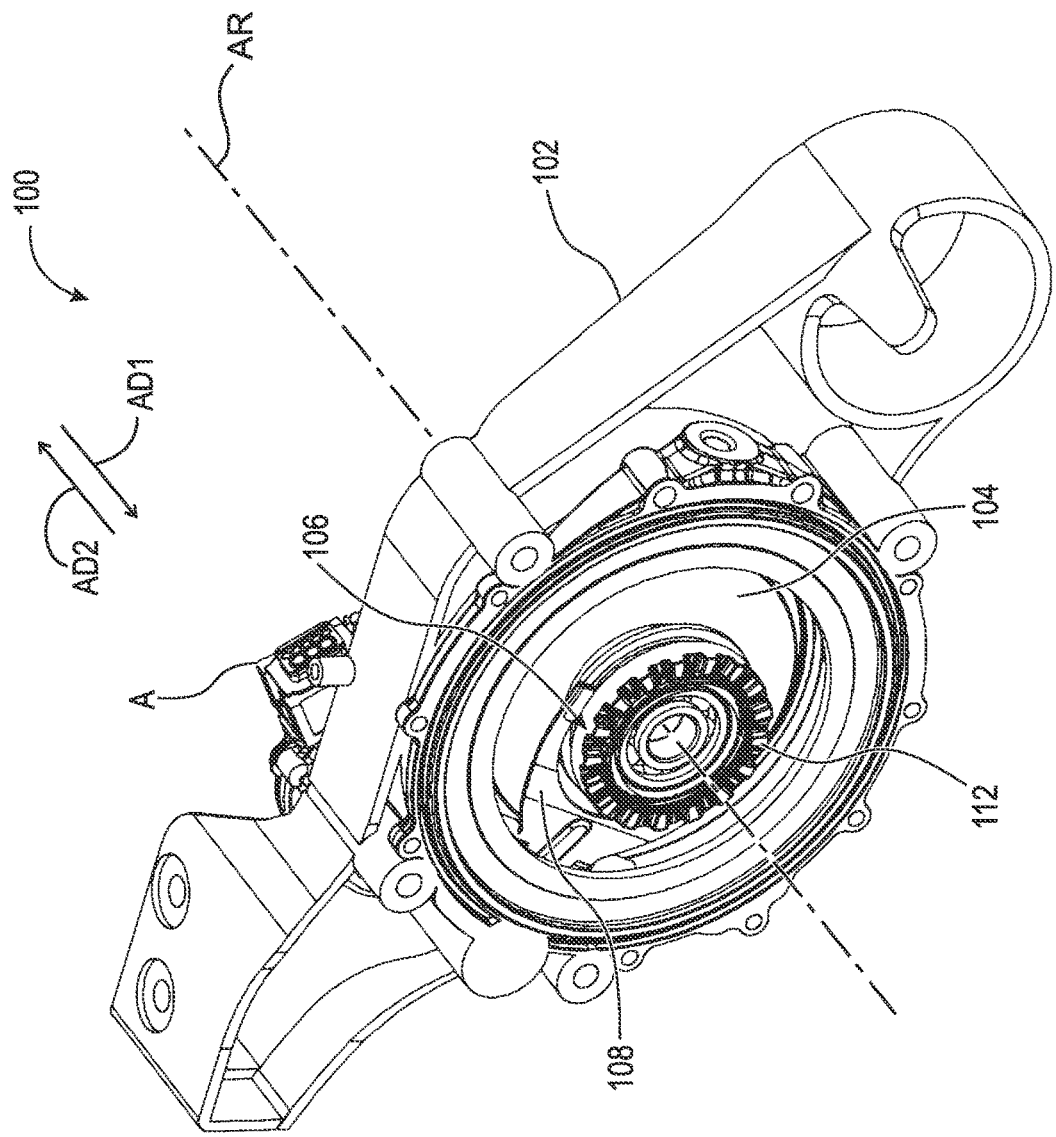
FIG. 1 is an isometric view of an axle disconnect assembly with blocked mode transition.

FIG. 1 is an isometric view of axle disconnect assembly 100 with blocked mode transition.

Figure 2:
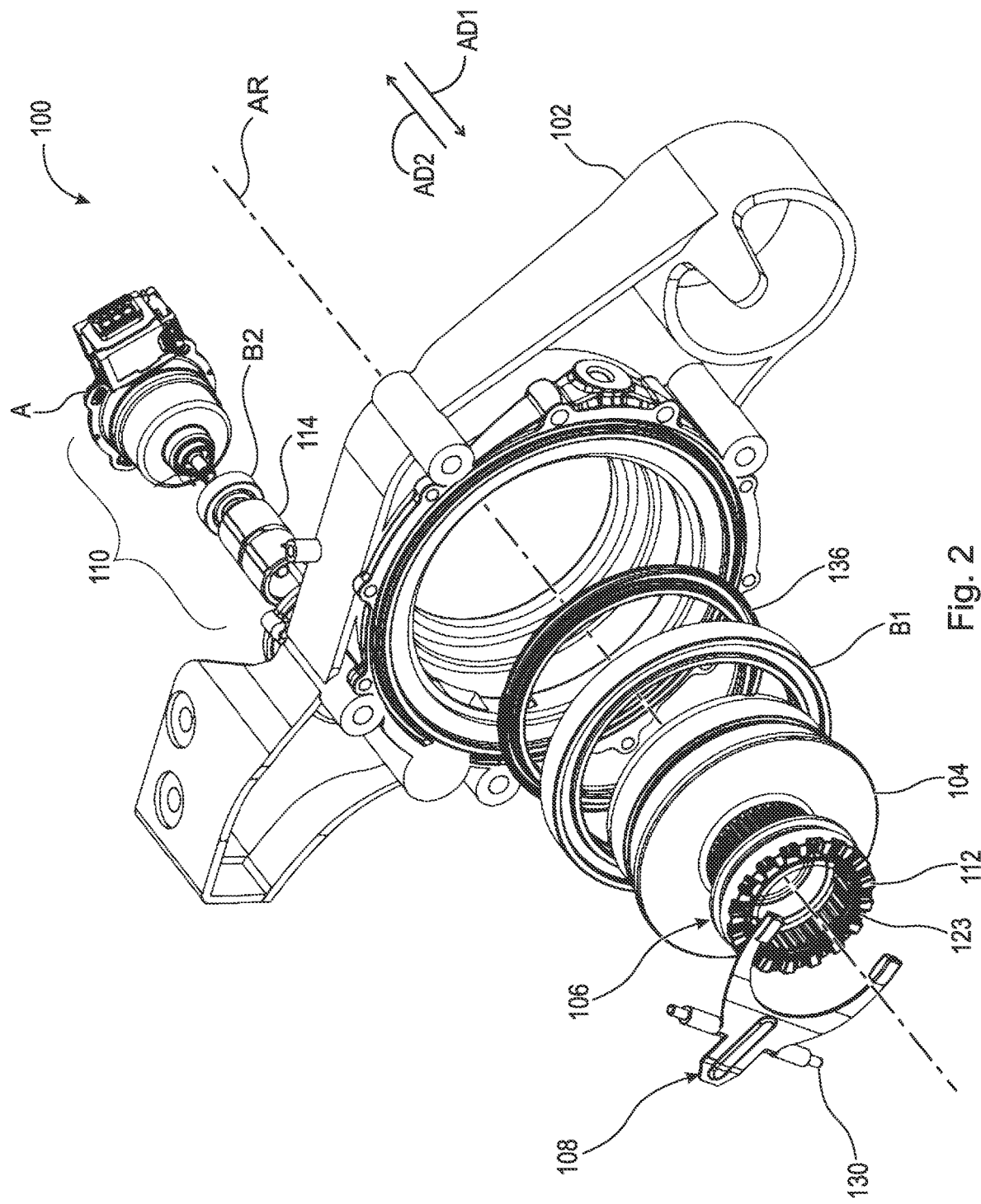
FIG. 2 is an exploded view of the axle disconnect assembly shown in FIG. 1.

FIG. 2 is an exploded view of axle disconnect assembly 100 shown in FIG. 1.

Figure 3:
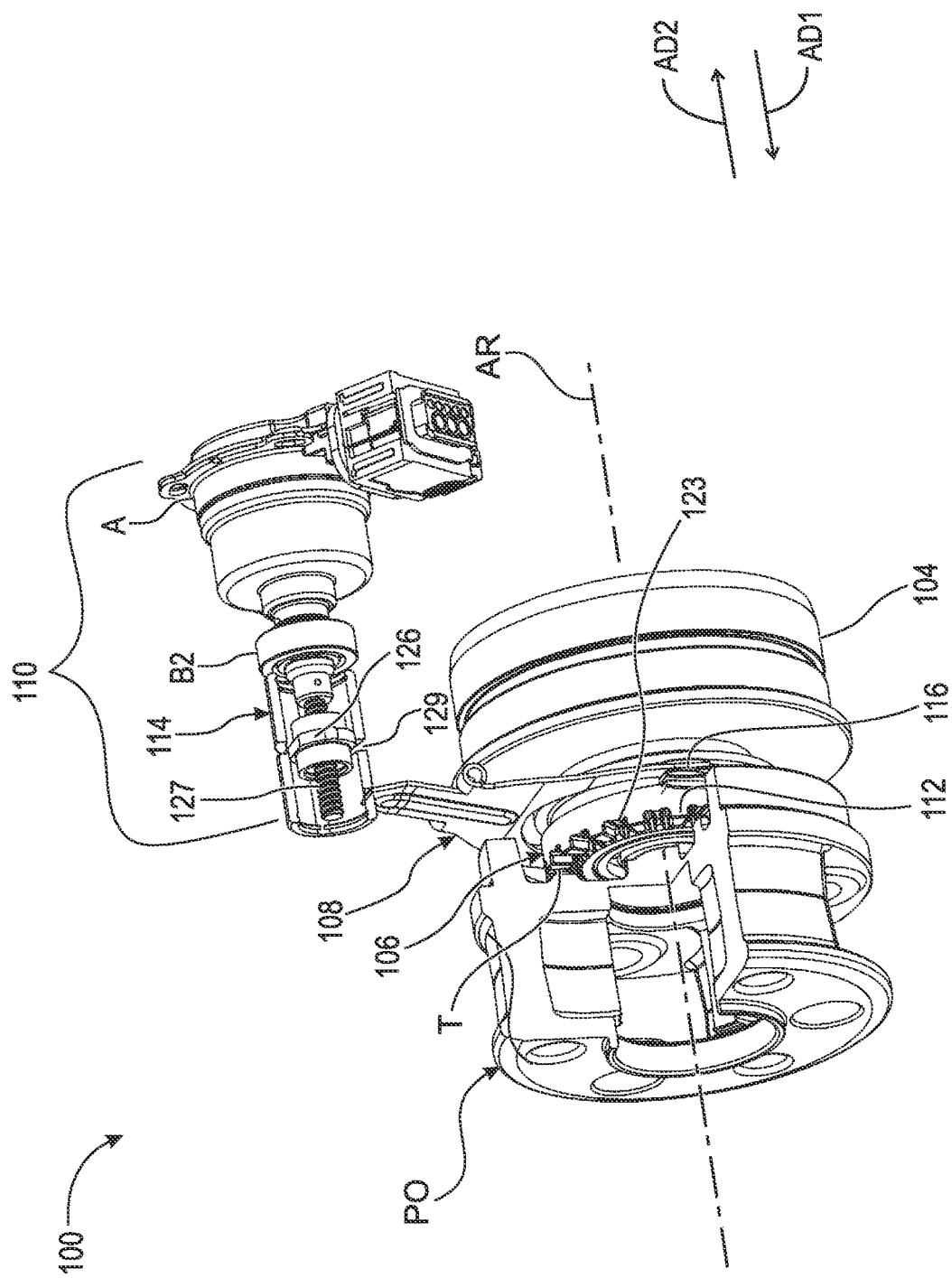
FIG. 3 is an isometric view of the axle disconnect assembly shown in FIG. 1 connected to a power output, in a first connect mode, and with a housing removed.

FIG. 3 is an isometric view of axle disconnect assembly 100 shown in FIG. 1 connected to a power output, in a first connect mode, and with a housing removed.

Figure 4:
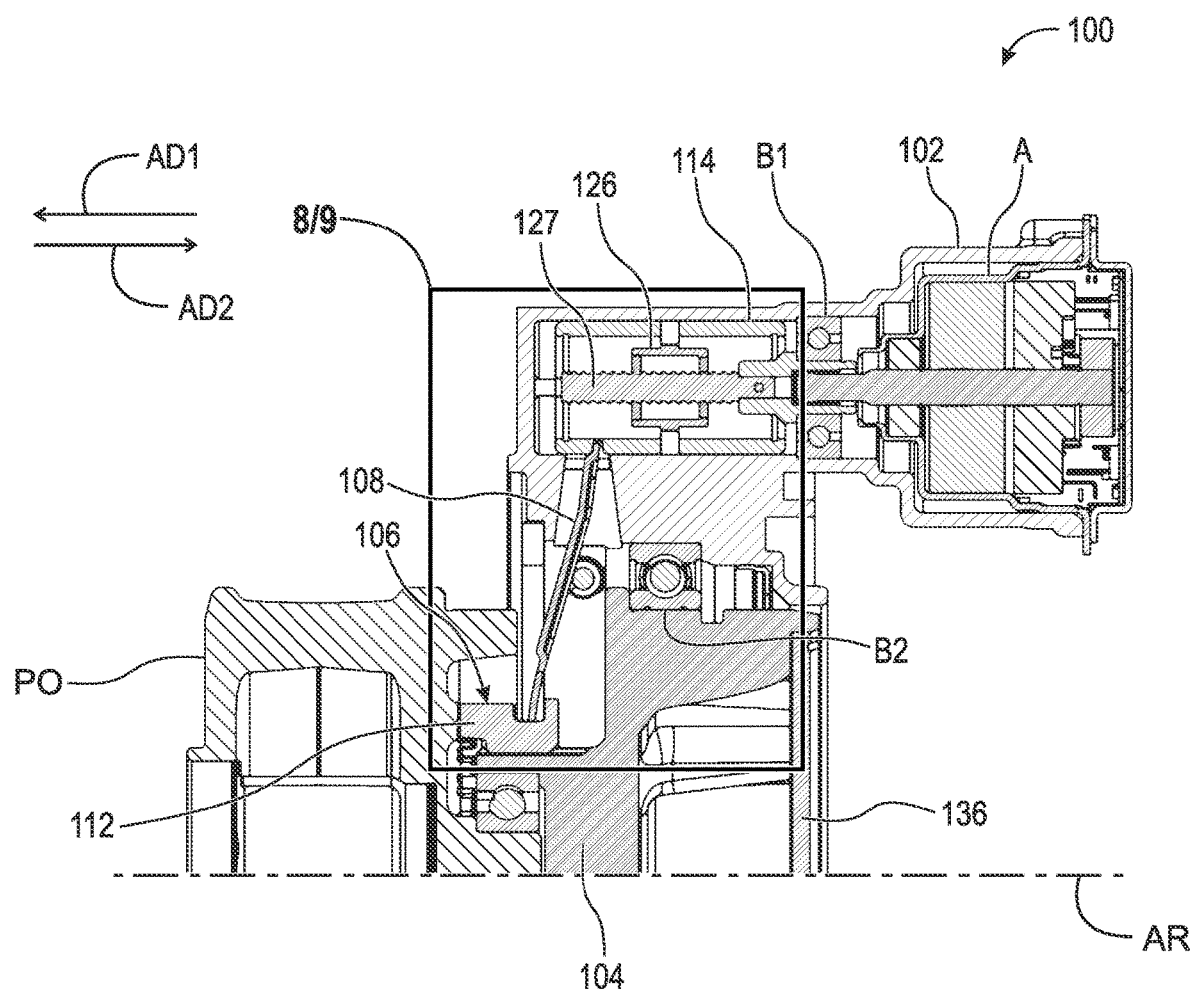
FIG. 4 is a partial cross-sectional view of the axle disconnect assembly and power output shown in FIG. 3 in the first connect mode.

FIG. 4 is a partial cross-sectional view of axle disconnect assembly 100 and the power output shown in FIG. 3 in the first connect mode.

Figure 5:
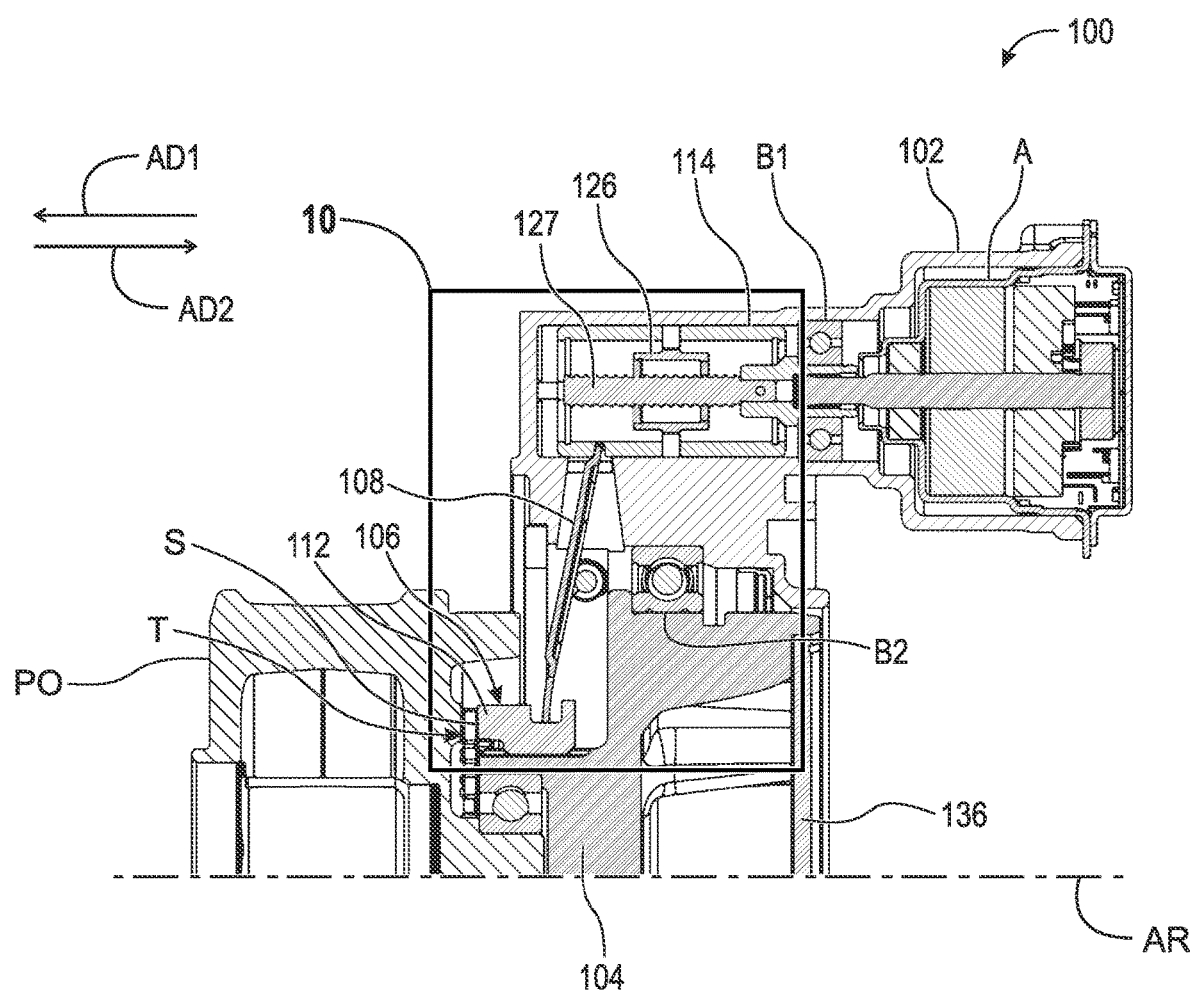
FIG. 5 is a partial cross-sectional view of the axle disconnect assembly and power output shown in FIG. 3 in a first blocked mode.

FIG. 5 is a partial cross-sectional view of axle disconnect assembly 100 and the power output shown in FIG. 3 in a first blocked mode. The following should be viewed in light of FIGS. 1 through 5. In FIG. 3, the power output has been cut-away to show the interface with assembly 100. Axle disconnect assembly 100 includes: housing 102; main shaft 104 at least partly enclosed by housing 102; sleeve 106; at least one resilient element 108; and shift assembly 110. Sleeve 106 is arranged to receive a rotational torque from power output PO. In general, output PO is for a prime mover, for example an electric motor (not shown). Sleeve 106: is non-rotatably connected to main shaft 104, for example splines 111 of main shaft 104 are meshed with sleeve 106; is axially displaceable with respect to main shaft 104, for example parallel to axis of rotation AR of sleeve 106, and includes teeth 112 facing in axial direction AD1 parallel to axis AR.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, connected to springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

In the example of FIG. 1, the at least on resilient element 108 includes a shift lever made of a resilient material such as spring steel and pivotable with respect to housing 102. In the discussion for axle disconnect assembly 100 that follows the terms "resilient element 108" and "resilient shift lever 108" are interchangeable. By "resilient material," we mean a material that can be deflected/bent from a free/unloaded state and that returns to the free state, without permanent deformation, when a force deflecting/bending the material is removed. In the example of FIG. 1, resilient shift lever 108 is made of heat-treated high-carbon steel. Die cast aluminum, diecast magnesium, and low carbon, non-heat-treated steel are examples of non-resilient materials. Resilient shift lever 108 is not limited to spring steel and can be fabricated from any suitable resilient material.

In the connect mode of axle disconnect assembly 100: teeth 112 are non-rotatably connected to power output PO, for example non-rotatably meshed with teeth T of power output PO; and resilient shift lever 108 has a shape as further described below.

In the example of FIG. 1, shift assembly 110 includes drive housing 114, directly connected to resilient shift lever 108. In the first blocked mode: teeth 112 are in contact with surfaces S of power output PO facing in axial direction AD2, opposite direction AD1; shift assembly 110, for example drive housing 114, is arranged to deflect, resilient shift lever 108 to a shape, as further describe below, different from the shape of resilient shift lever 108 in the connect mode; and resilient shift lever 108 is arranged to urge sleeve 106 against surfaces S. In the example of FIG. 3, surfaces S are formed by teeth T. In the discussion for assembly 100 that follows, the terms "deflect", and "bend" are interchangeable.

By one component "directly connected to" another component, we mean that the components are in direct contact, or that the components are each in direct contact with one or more ancillary intermediate parts for example, a cap fixed to an end of a spring, such that the components and the ancillary parts are mechanically solid at the points of contact with the one or more ancillary intermediate parts. For example, a washer or coating could be disposed between the two components. Unless otherwise modified, the direct connection is constant.

Figure 6:
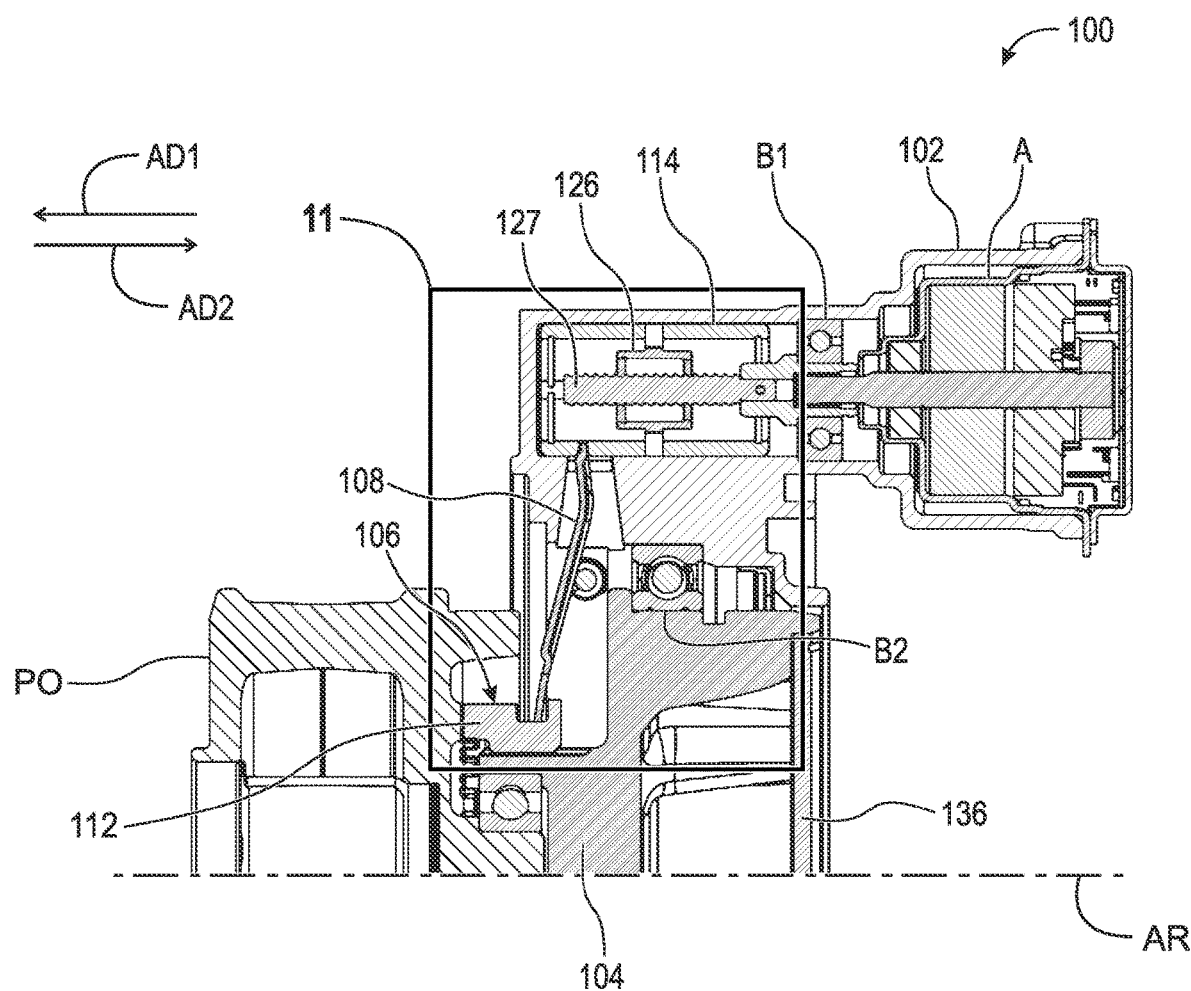
FIG. 6 is a partial cross-sectional view of the axle disconnect assembly and power output shown in FIG. 3 in a second blocked mode.

FIG. 6 is a partial cross-sectional view of axle disconnect assembly 100 and power output PO shown in FIG. 3 in a second blocked mode.

Figure 7:
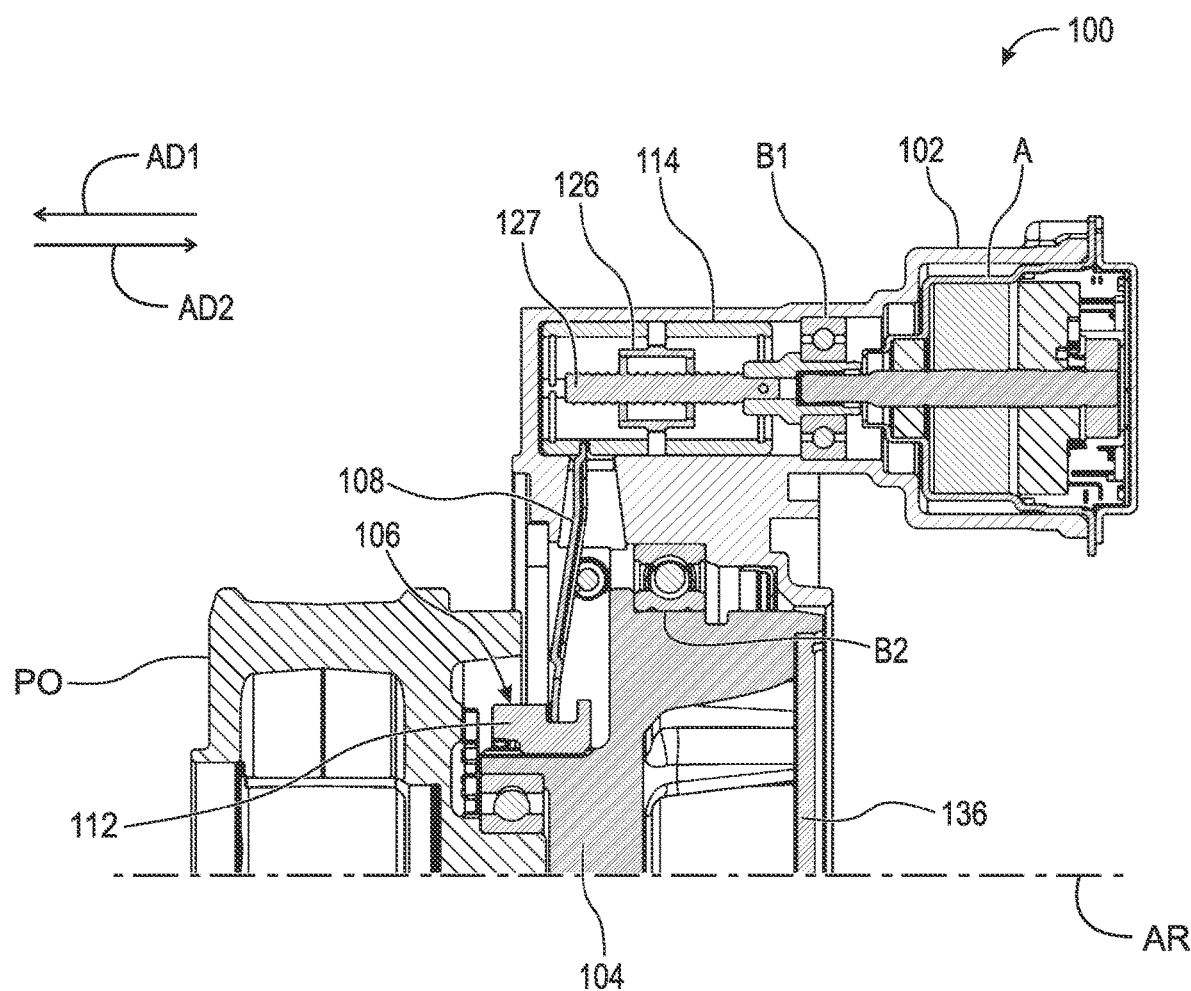
FIG. 7 is a partial cross-sectional view of the axle disconnect assembly and power output shown in FIG. 3 in a disconnect mode.

FIG. 7 is a partial cross-sectional view of axle disconnect assembly 100 and power output PO shown in FIG. 3 in a disconnect mode. The following should be viewed in light of FIGS. 1 through 7. Resilient shift lever 108 includes ends 116 directly connected to sleeve 106, for example disposed in groove 118 of sleeve 106, and end 120 directly connected to shift assembly 110, for example disposed in slot 122 of drive housing 114. In the disconnect mode of axle disconnect assembly 100, teeth 112 are free of contact with power output PO.

FIG. 8 is a detail of area 8/9 in FIG. 4.

FIG. 9 is a detail of area 8/9 in FIG. 4 in a second connect mode.

Figure 10:
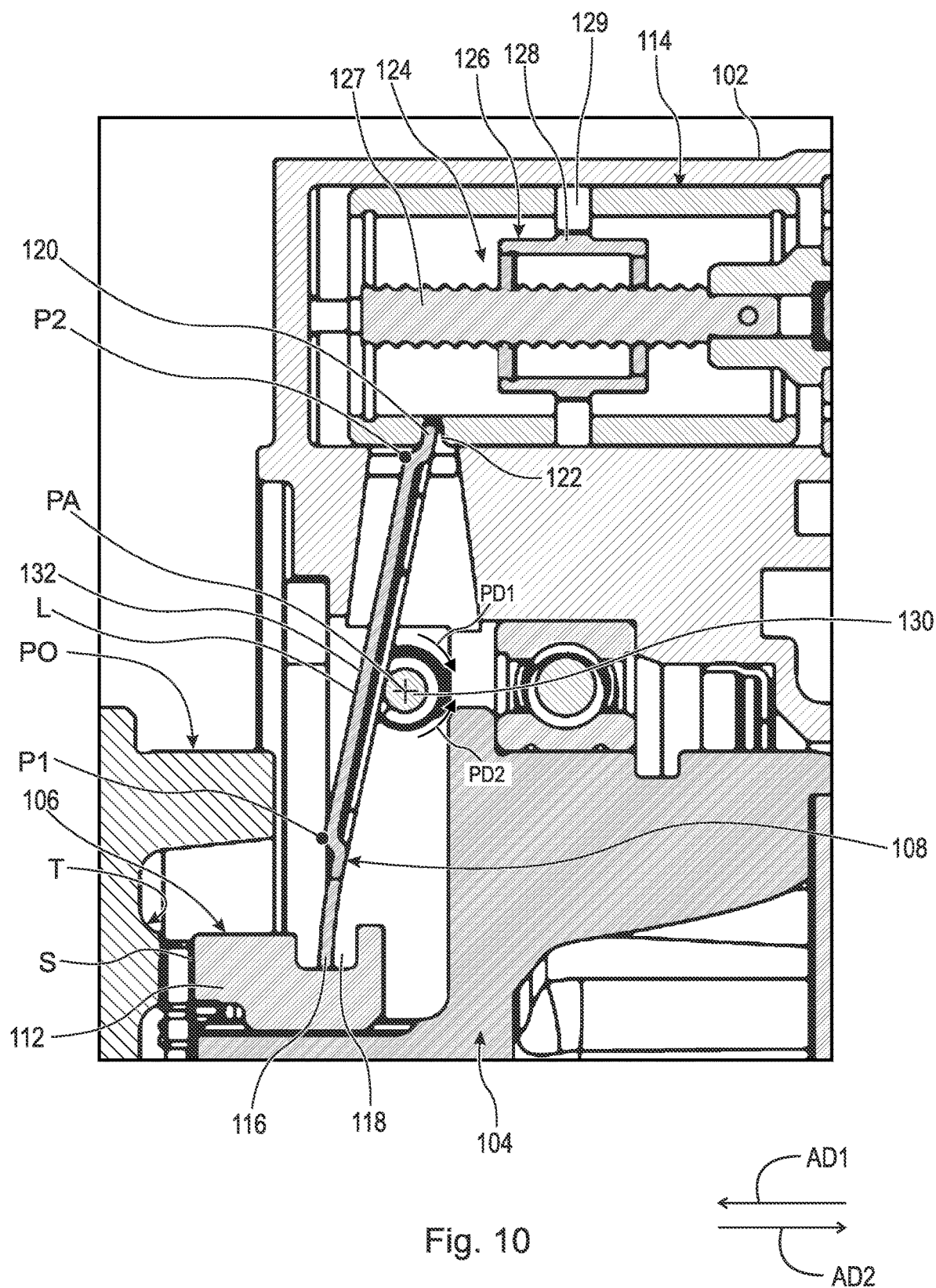
FIG. 10 is a detail of area 10 in FIG. 5.

FIG. 10 is a detail of area 10 in FIG. 5.

Figure 11:
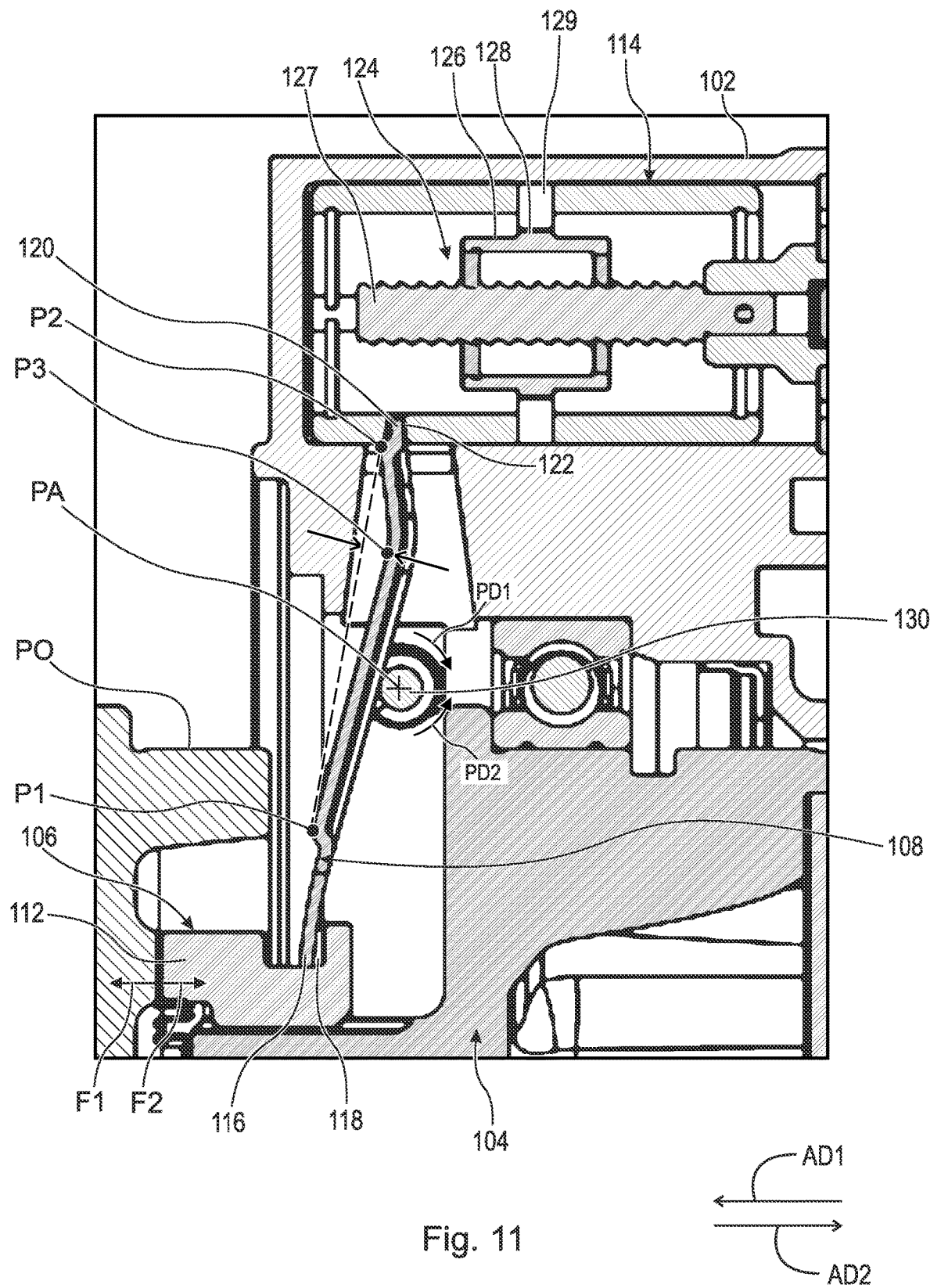
FIG. 11 is a detail of area 11 in FIG. 6.

FIG. 11 is a detail of area 11 in FIG. 6. The following should be viewed in light of FIGS. 1 through 11. In the second blocked mode: teeth 112 are meshed with teeth T and displacement of sleeve 106 away from power output PO in direction AD2 is blocked by force F1 on sleeve 106 and/or power output PO; resilient shift lever 108 is arranged to urge sleeve 106 in axial direction AD2 with force F2, less than force F1; and shift assembly 110, for example drive housing 114, is arranged to deflect resilient shift lever 108 to a shape, as further described below, different from the shape of resilient shift lever 108 in the first or second connect mode, without displacing sleeve 106 in direction AD2.

To transition from the first blocked mode to the first or second connect mode: sleeve 106 and power output PO are arranged to rotate with respect to each other (one or both of sleeve 106 and power output PO can perform the rotation) so that teeth 112 and teeth T are no long axially aligned and teeth 112 no longer contact surfaces S, and teeth T align with indents 123 defined by teeth 112; drive housing 114 is arranged to remain fixed with respect to housing 102; resilient shift lever 108 is arranged to un-deflect, and displace sleeve 106 in axial direction AD1 to mesh teeth 112 with teeth T. In the first connect mode shown in FIGS. 4 and 8, resilient shift lever resilient shift lever 108 does not urge sleeve 106 in direction AD1. In the second connect mode of FIG. 9, resilient shift lever 108 urges sleeve 106 in direction AD1.

To transition from the second blocked mode to the disconnect mode, force F1 is arranged to be reduced to less than force F2, for example by diminishing torque on power output PO and/or sleeve 106; drive housing 114 is arranged to remain fixed with respect to housing 102; resilient shift lever 108 is arranged to un-deflect return to the shape of the disconnect mode, and displace sleeve 106 in axial direction AD2 to disengage teeth 112 from teeth T. In the example of FIG. 1, resilient shift lever 108 has a same shape in the first connect mode and in the disconnect mode.

In the example of FIG. 1, shift assembly 110 includes shift component 124. To transition from the disconnect mode to the first blocked mode: at least a portion of shift assembly 110, for example shift component 124, is arranged to be displaced by actuator A; shift component 124 is arranged to displace drive housing 114; shift assembly 110, for example drive housing 114, is arranged to displace resilient shift lever 108; resilient shift lever 108 is arranged to displace sleeve 106 into contact with power output PO; shift assembly 110, for example drive housing 114, is arranged to deflect, resilient shift lever 108 from the shape of the disconnect mode to the shape of the first blocked mode. In the example of FIG. 1, actuator A is included with assembly 100; however, it is understood that it is not necessary for actuator A to be included with assembly 100. Actuator A can be any suitable actuator known in the art.

To transition from the first or second connect mode to the second blocked mode: at least a portion of shift assembly 110, for example shift component 124, is arranged to be displaced by actuator A; and shift assembly 110, for example drive housing 114, is arranged to deflect, resilient shift lever 108 from the shape of the connect mode to the shape of the second blocked mode.

In the example of FIG. 1: shift component 124 includes a ball screw including ball nut 126 and shaft 127. In the discussion that follows, the terms "shift component 124" and "ball screw 124" are interchangeable. Ball screw 124 is at least partly enclosed by drive housing 114 and is axially fixed to drive housing 114, for example by lip 128 in slot 129 defined by housing 114. In the example of FIG. 1, shift lever 108 includes pivot pins 130. As further described below, resilient shift lever 108 is pivotable, with respect to housing 102, about pivot axis PA of pins 130.

To transition from the disconnect mode to the first blocked mode: actuator A is arranged to rotate shaft 127 to displace ball nut 126 and drive housing 114 in axial direction AD2; drive housing 114 is arranged to pivot resilient shift lever 108 in pivot direction PD1 around pivot axis PA; resilient shift lever 108 is arranged to displace sleeve 106 in axial direction AD1 and into contact with surfaces S of power output PO; and drive housing 114 is arranged to continue pivoting resilient shift lever 108 in pivot direction PD1 to bend resilient shift lever 108 from the shape of the disconnect mode to the shape of the first blocked mode.

In the example of FIG. 1, the bending of shift lever 108 in the first blocked mode is seen with respect to surface 132 of resilient shift lever 108 between point P1 on resilient shift lever 108 and point P2 on resilient shift lever 108. In the connect mode of FIG. 8 and in the disconnect mode of FIG. 7, shift lever 108 and surface 132 are bent so that straight line L, connecting points P1 and P2, has a maximum gap 134, orthogonal to line 1, from point P3 on surface 132. In the connect mode of FIG. 9, shift lever 108 and surface 132 are bent so that straight line 1, connecting points P1 and P2, has a maximum gap 135, orthogonal to line 1, from point P3 on surface 132. Gap 135 is less than gap 134. In the first blocked mode of FIGS. 5 and 10, straight line L is co-linear with surface 132. That is, the urging of teeth 112 against surfaces S by resilient shift lever 108 bends shift lever 108 to remove gap 134 or 135.

To transition from the first blocked mode to the first or second connect mode: sleeve 106 and power output PO rotate with respect to each other, as described below, to misalign teeth 112 and teeth T; the axial position of drive housing 114 with respect to housing 102 remains fixed; and resilient shift lever 108 unbends and displaces sleeve 106 in direction AD1 to mesh teeth 112 with teeth T. For the second connect mode, actuator A is arranged to displace drive housing in direction AD2 to slightly un-deflect resilient shift lever 108 to urge sleeve 106 in direction AD1.

To transition from the first or second connect mode to the second blocked mode: actuator A is arranged to rotate shaft 127 and displace ball nut 126 and drive housing 114 in axial direction AD1; and drive housing 114 is arranged to deflect resilient element/shift lever 108 from the shape of the first or second connect mode to the shape of the second blocked mode with force F1 while force F2 fixes teeth 112 to output PO. In an example embodiment, rotational torque on one or both of output PO and sleeve 106 generates force F2.

To transition from the second blocked mode to the disconnect mode: force F1 is arranged to lessen to less than force F2, for example by modifying torque transmitted by power output PO or modifying torque on sleeve 106; and resilient shift lever 108 is arranged to un-deflect to the shape of the disconnect mode and displace sleeve 106 in axial direction AD2 to disengage teeth 112 from teeth T, while the axial position of drive housing 114 with respect to housing 102 remains fixed.

In the example of FIG. 1, assembly 100 includes end plate 136, bearing B1, and bearing B2.

Axle disconnect assembly 100 provides expanded functionality, while minimizing parts count, complexity, and footprint of assembly 100 by integrating a novel energy-storing function into resilient shift lever 108. A single component, resilient shift lever 108, stores energy generated by the bending of shift lever 108 during the transitions into the first and second blocked modes. Then, without requiring the energizing of another component, resilient shift lever 108 releases the stored energy and displaces sleeve 106: in axial direction AD1 to transition assembly 100 from the first blocked mode to the connect mode; or in axial direction ADZ to transition assembly 100 from the second blocked mode to the disconnect mode.

Figure 12:
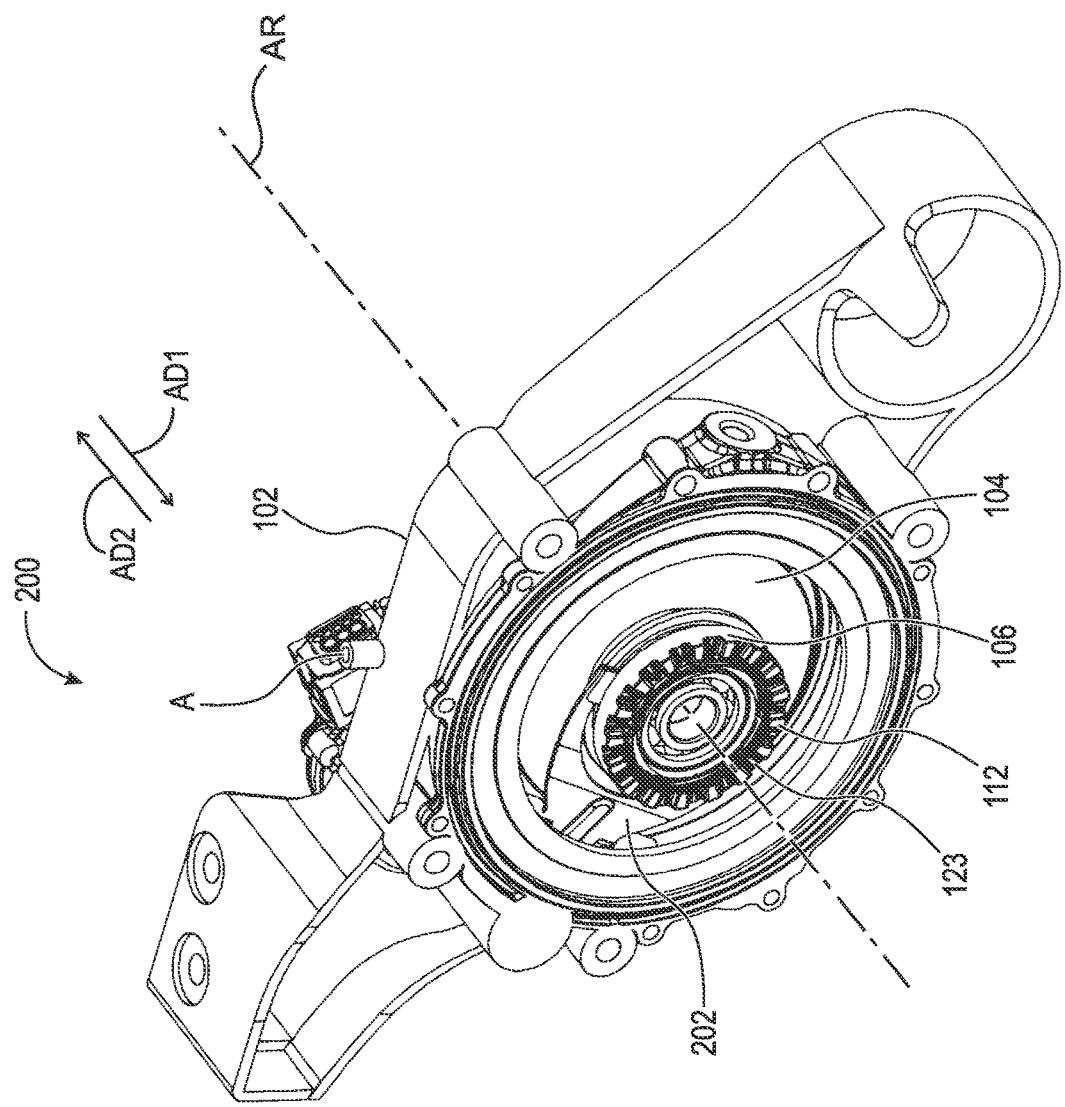
FIG. 12 is an isometric view of an axle disconnect assembly with blocked mode transition.

FIG. 12 is an isometric view of axle disconnect assembly 200 with blocked mode transition.

Figure 13:
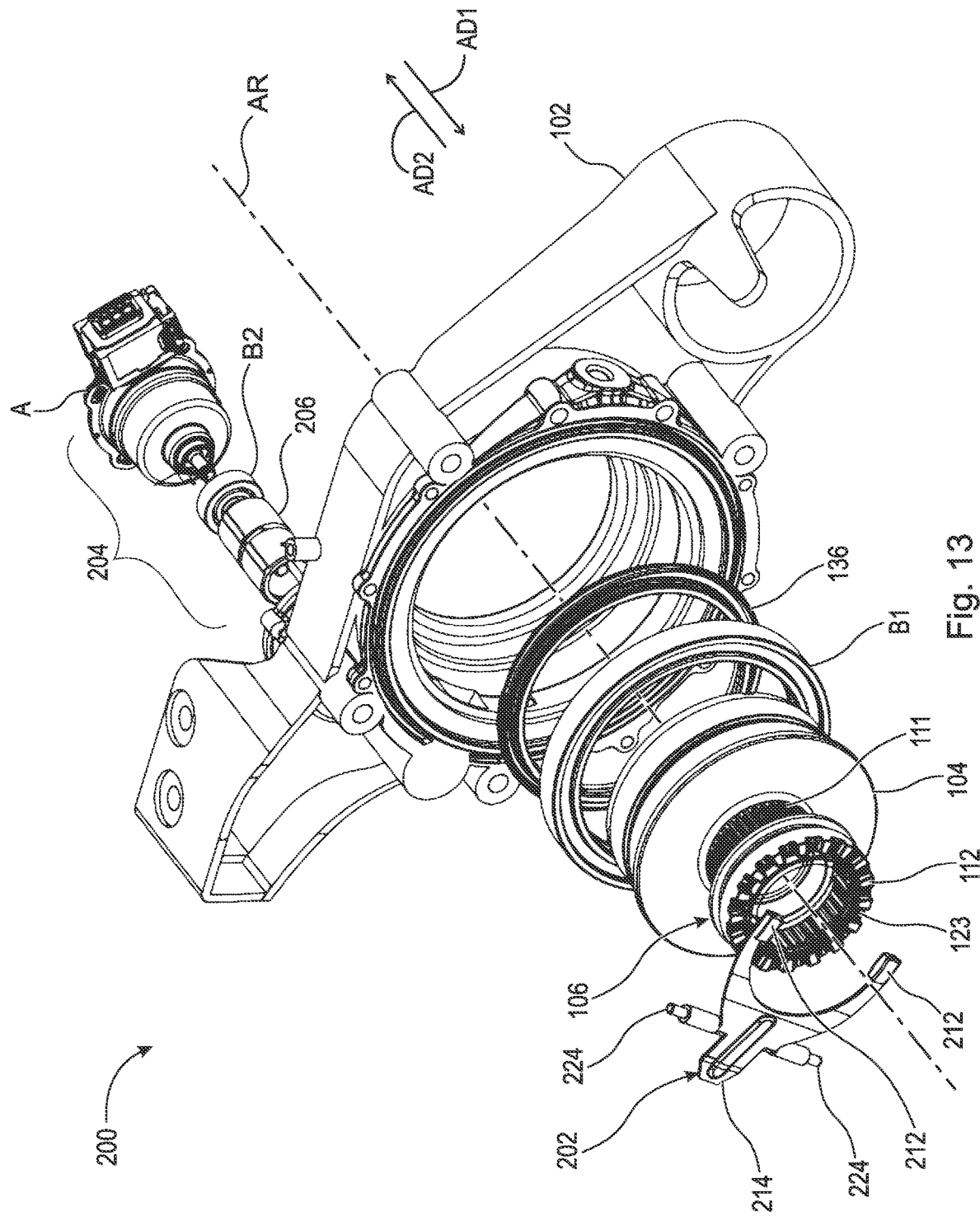
FIG. 13 is an exploded view of the axle disconnect assembly shown in FIG. 12.

FIG. 13 is an exploded view of axle disconnect assembly 200 shown in FIG. 12.

Figure 14:
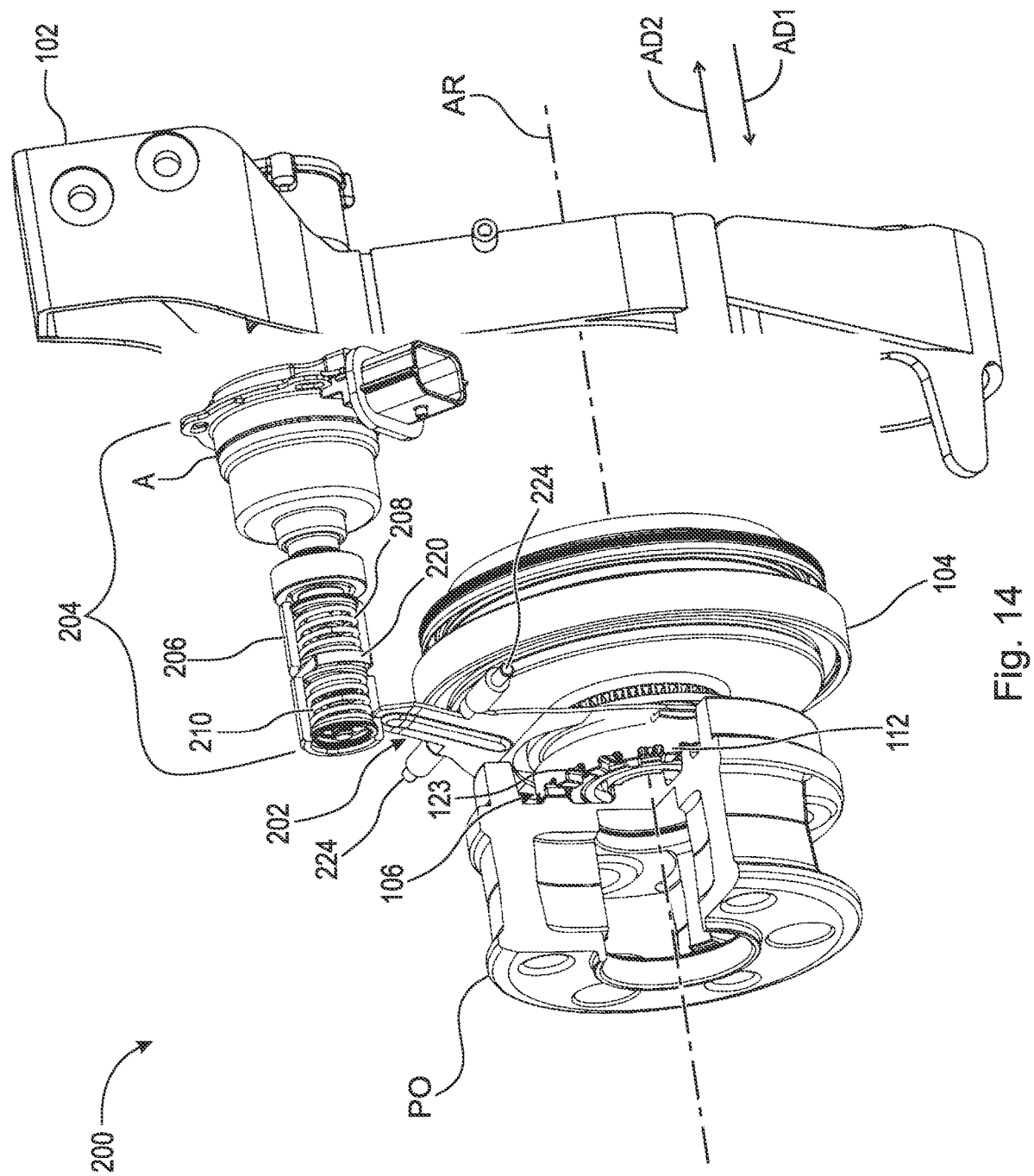
FIG. 14 is an isometric view of the axle disconnect assembly shown in FIG. 12 connected to a power output, in a first connect mode, and with a housing partially removed.

FIG. 14 is an isometric view of axle disconnect assembly 200 shown in FIG. 12 connected to power output PO, in a first connect mode, and with a housing partially removed.

Figure 15:
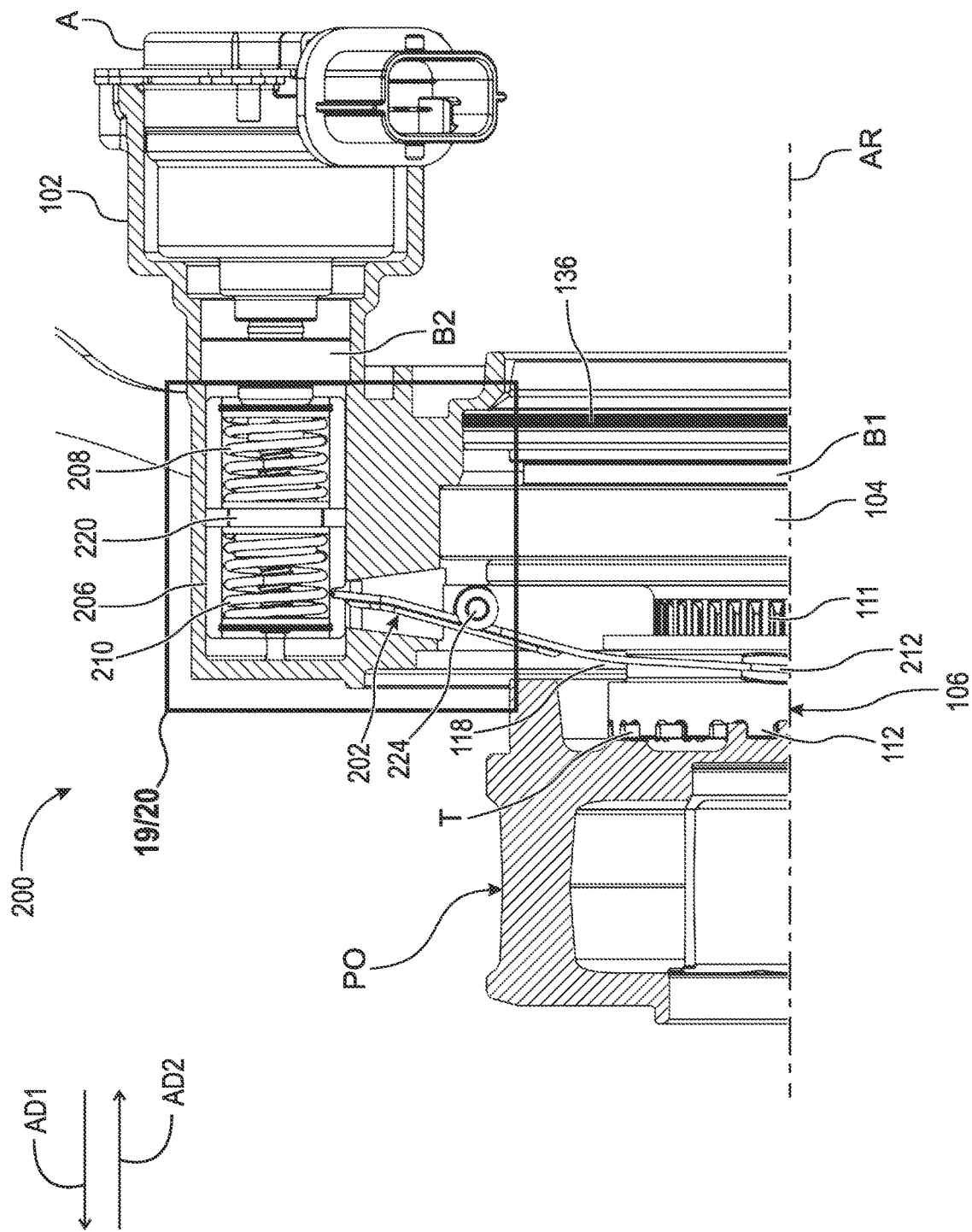
FIG. 15 is a cut-away and cross-sectional view of the axle disconnect assembly and the power output shown in FIG. 14 in the first connect mode.

FIG. 15 is a cut-away and cross-sectional view of axle disconnect assembly 200 and power output PO shown in FIG. 14 in the first connect mode.

Figure 16:
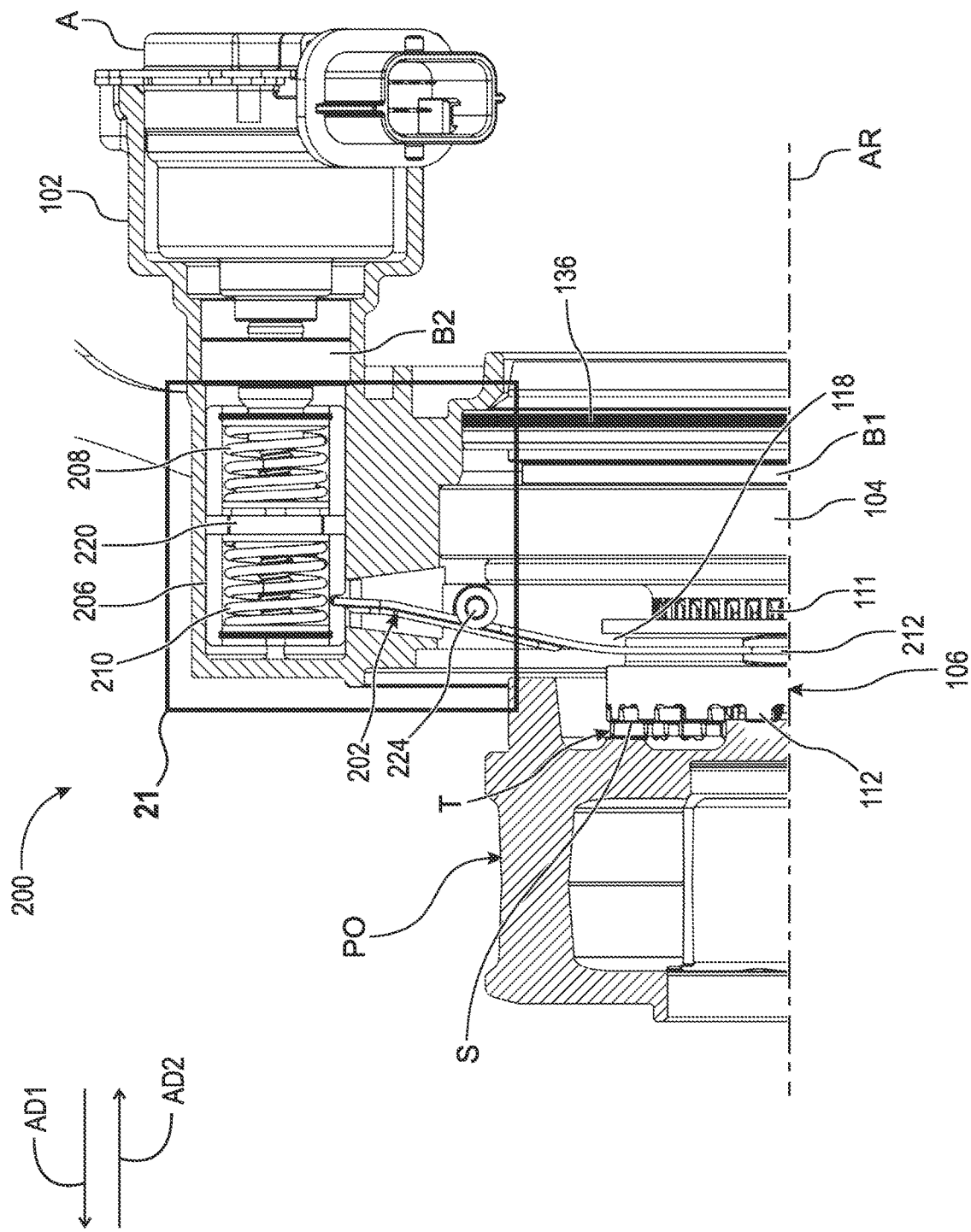
FIG. 16 is a cut-away and cross-sectional view of the axle disconnect assembly and the power output shown in FIG. 14 in a first blocked mode.

FIG. 16 is a cut-away and cross-sectional view of axle disconnect assembly 200 and power output PO shown in FIG. 14 in a first blocked mode.

The following should be viewed in light of FIGS. 1 through 16. Axle disconnect assembly 200 includes: housing 102; main shaft 104; sleeve 106; shift lever 202 pivotable with respect to housing 102; and shift assembly 204. In the example of FIG. 12, shift assembly 204 includes: drive housing 206; resilient element 208; and resilient element 210. In the example of FIG. 12, resilient elements 208 and 210 are coil springs. In FIG. 14, power output PO has been partially cut-away to show the interface of output PO with assembly 200.

In the first and second connect modes of axle disconnect assembly 200: teeth 112 are non-rotatably connected to power output PO, for example non-rotatably meshed with teeth T of power output PO; resilient element 208 has a shape for example a length, as further described below; and resilient element 210 has a shape, for example a length, as further described below.

In the first blocked mode: teeth 112 are in contact with surfaces S of power output PO; drive housing 206 is arranged to deflect, for example compress, resilient element 208 to a shape, as further described below, different from the shape of element 208 in the connect mode; resilient element 210 is arranged to expand to a shape, as further described below, different from the shape of element 210 in the first and second connect modes; and resilient element 208 is arranged to urge sleeve 106 against surfaces S.

Figure 17:
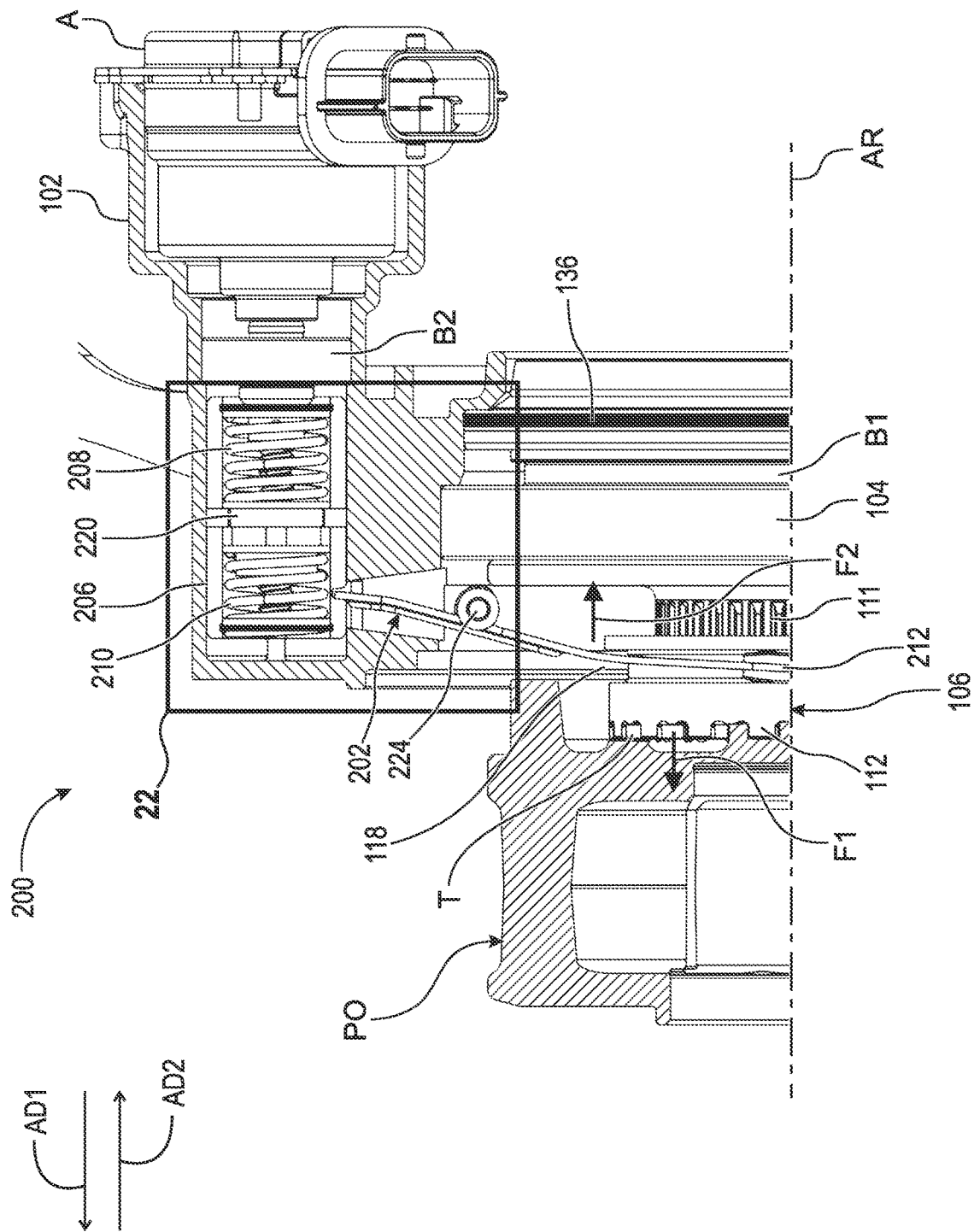
FIG. 17 is a cut-away and cross-sectional view of the axle disconnect assembly shown in FIG. 14 in a second blocked mode.

FIG. 17 is a cut-away and cross-sectional view of axle disconnect assembly 200 and power output PO shown in FIG. 14 in a second blocked mode.

Figure 18:
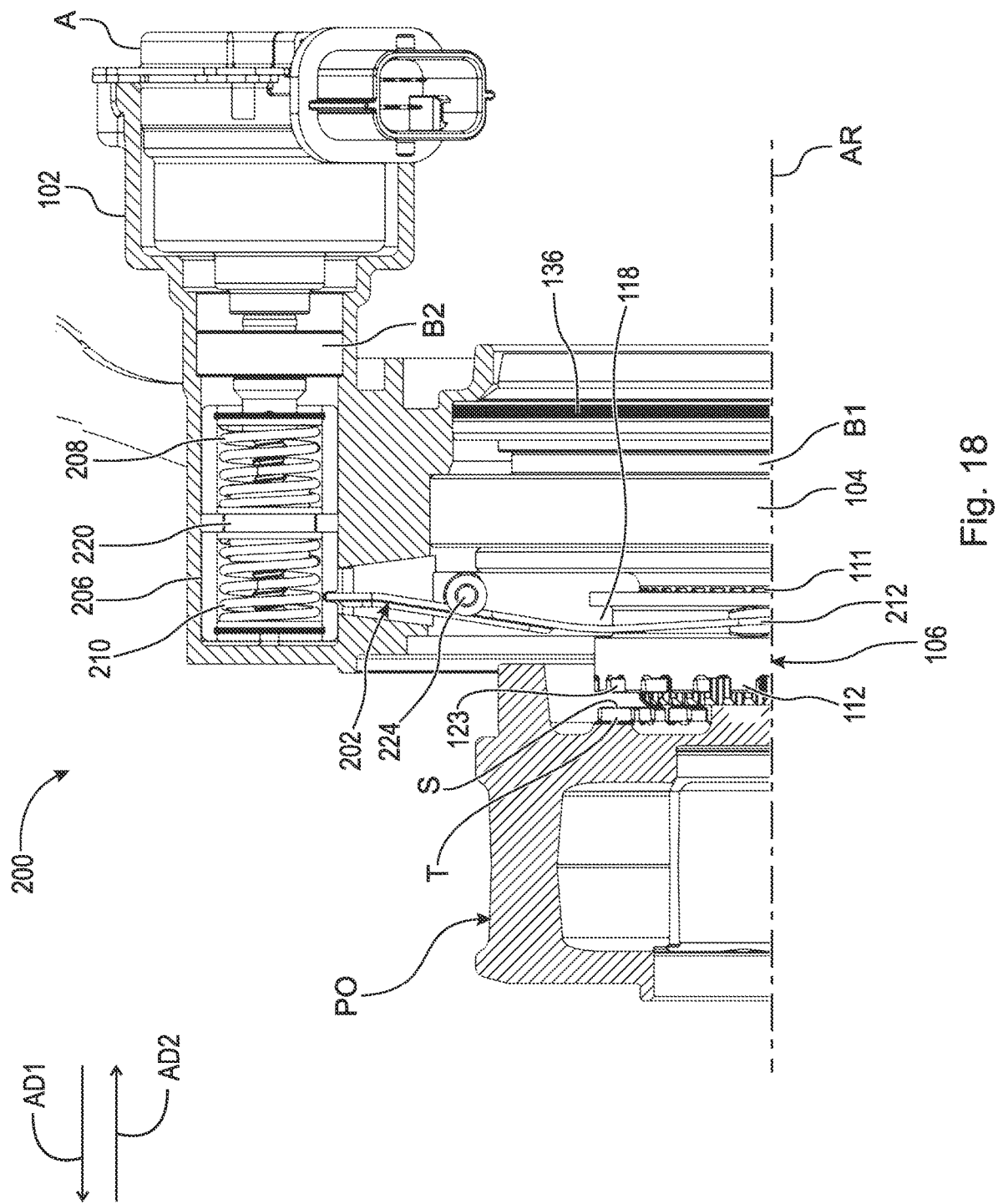
FIG. 18 is a cut-away and cross-sectional view of the axle disconnect assembly and the power output shown in FIG. 14 in a disconnect mode.

FIG. 18 is a cut-away and cross-sectional view of axle disconnect assembly 200 and power output PO shown in FIG. 14 in a disconnect mode. The following should be viewed in light of FIGS. 1 through 18. In the disconnect mode of axle disconnect assembly 200: teeth 112 are free of contact with power output PO; sleeve 106 and output PO are rotatable with respect to each other; resilient element 208 has a shape, for example a length, as described further below; resilient element 210 has a shape, for example a length, as further described below.

In the second blocked mode: teeth 112 are meshed with teeth T; sleeve 106 is blocked from displacement, with respect to output PO, in direction AD2 by force F1; force F1 acts on one or both of sleeve 106 or output PO, for example force F1 results from a rotational torque on one of sleeve 106 or output PO; drive housing 206 is arranged to deflect, for example compress, resilient element 210 to a shape, as further described below, different from the shape of element 210 in the first or second connect mode; resilient element 208 is arranged to expand to a shape, as further described below, different from the shape of element 208 in the first or second connect mode; and resilient element 210 is arranged to urge sleeve 106 in axial direction AD2 with force F2, less than force F1.

To transition from the first blocked mode to the first and second connect modes: sleeve 106 and power output PO are arranged to rotate with respect to each other so that teeth 112 and teeth T are no long axially aligned, teeth 112 no longer contact surfaces S, and teeth T axially align with indents 123 defined by teeth 112; resilient element 208 is arranged to un-deflect, for example expand, and displace sleeve 106 in axial direction AD1 to mesh teeth 112 with teeth T and non-rotatably connect sleeve 106 and output PO.

To transition from the second blocked mode to the disconnect mode, force F1 is arranged to lessen to less than force F2, for example by diminishing torque on power output PO and/or sleeve 106; resilient element 210 is arranged to un-deflect, for example expand, and displace sleeve 106 in axial direction AD2 to disengage teeth 112 from teeth T.

To transition from the disconnect mode to the first blocked mode: drive housing 206 is arranged to be displaced by actuator A in axial direction AD2; drive housing 206 is arranged to displace sleeve 106 in axial direction AD1, and into contact with surfaces S of power output PO; drive housing 206 is arranged to deflect, for example compress, resilient element 208 as noted above; and resilient element 210 is arranged to expand as noted above. In the example of FIG. 12, actuator A is included with assembly 200; however, it is understood that it is not necessary for actuator A to be included with assembly 200. Actuator A can be any suitable actuator known in the art.

To transition from the first or second connect mode to the second blocked mode: drive housing 206 is arranged to be displaced by actuator A in axial direction AD1; drive housing 206 is arranged to deflect, for example compress, resilient element 210 as noted above; and resilient element 208 is arranged to expand as noted above.

Figure 19:
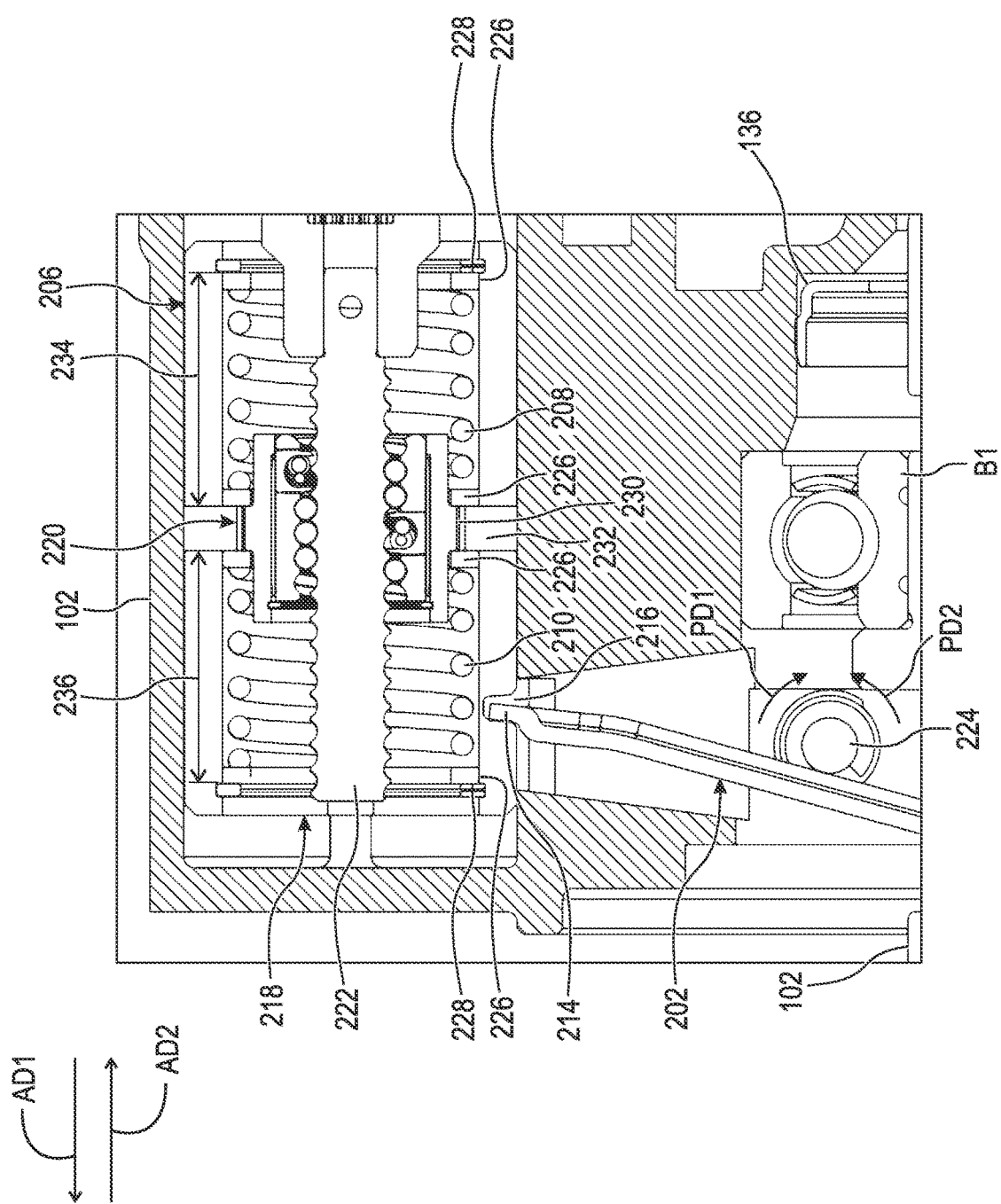
FIG. 19 is a detail of area 19/20 in FIG. 15.

FIG. 19 is a detail of area 19/20 in FIG. 15.

Figure 20:
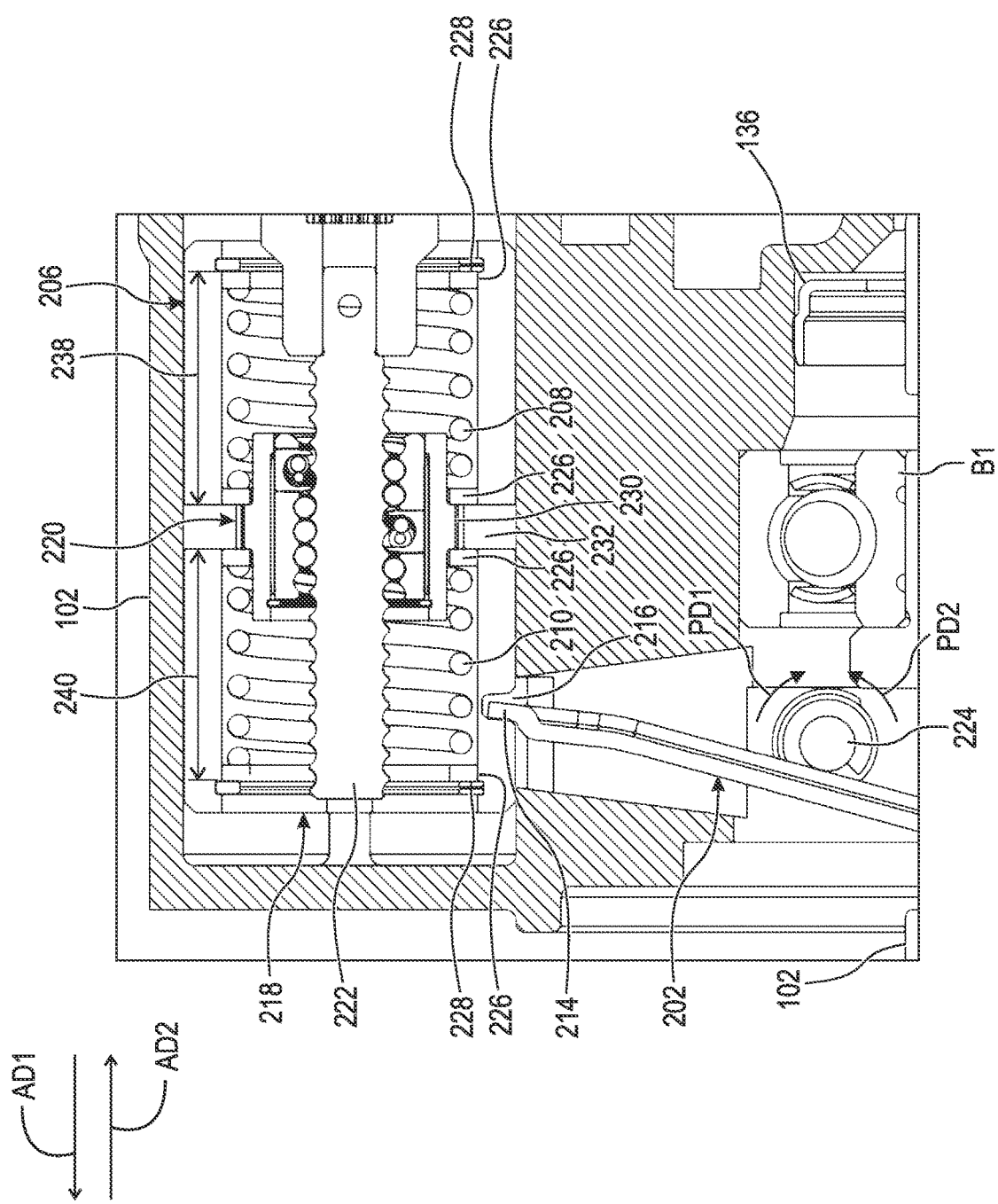
FIG. 20 is a detail of area 19/20 in FIG. 15 in a second connect mode.

FIG. 20 is a detail of area 19/20 in FIG. 15 in the second connect mode.

Figure 21:
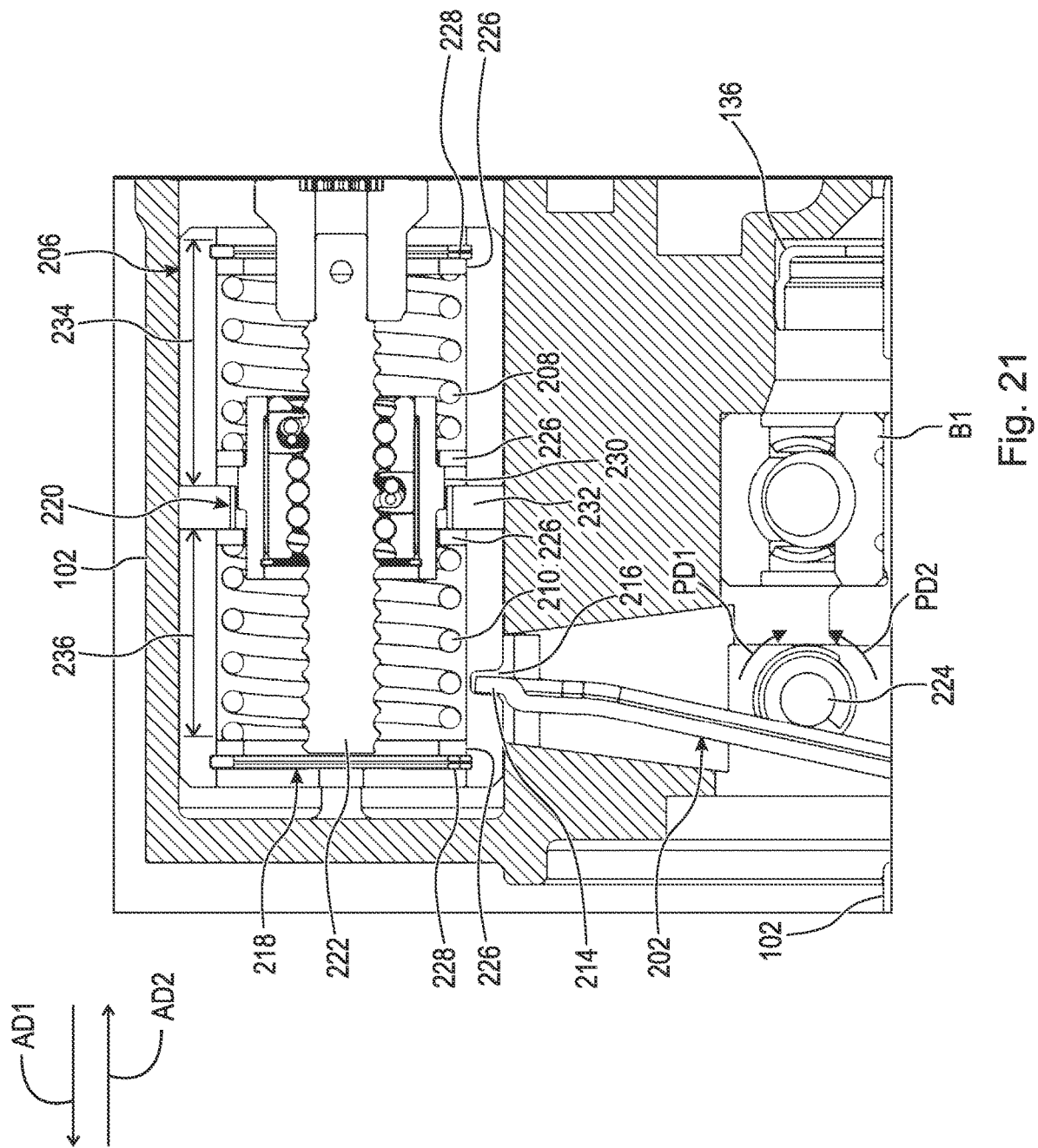
FIG. 21 is a detail of area 21 in FIG. 16.

FIG. 21 is a detail of area 21 in FIG. 16. The following should be viewed in light of FIGS. 1 through 21. In the example of FIG. 12, shift lever 202 includes ends 212 directly connected to sleeve 106, for example disposed in groove 118 of sleeve 106, and end 214 directly connected to drive housing 206, for example disposed in slot 216 of drive housing 206.

In the example of FIG. 12, shift assembly 204 includes ball screw 218 with ball nut 220 and shaft 222. Ball screw 218 is at least partly enclosed by drive housing 206. Ball nut 220 is axially displaceable within drive housing 206. In the example of FIG. 12: shift lever 202 includes pivot pins 224 connected to housing 102; and shift assembly 204 is arranged to pivot shift lever 202, with respect to housing 102, around pins 224. Other configurations for enabling pivoting of lever 202 are possible, for example pins fixedly connected to housing 102 and connected to lever 202.

In the example of FIG. 12, resilient element 208 and resilient element 210 each include two caps 226. One cap 226 is in contact with a snap ring 228, and the other cap 226 is in contact with lip 230 of ball nut 220 and/or lip 232 of housing 206. In the example of FIG. 12, resilient element 208 and resilient element 210 are preloaded. Thus: resilient element 208 reacts against cap 226 and snap ring 228 to urge ball nut 220 in direction AD1; and resilient element 210 reacts against cap 226 and snap ring 228 to urge ball nut 220 in direction AD2. In the example of FIG. 12: in the first connect mode and in the disconnect mode, resilient element 208 and resilient element 210 are in stable equilibrium positions; resilient element 208 has length 234; and resilient element 210 has length 236 equal to length 234. In the second connect mode: resilient element 208 has length 238 less than length 234; resilient element 210 has length 240 greater than length 236; and resilient element 208 urges sleeve 106 in direction AD1.

Figure 22:
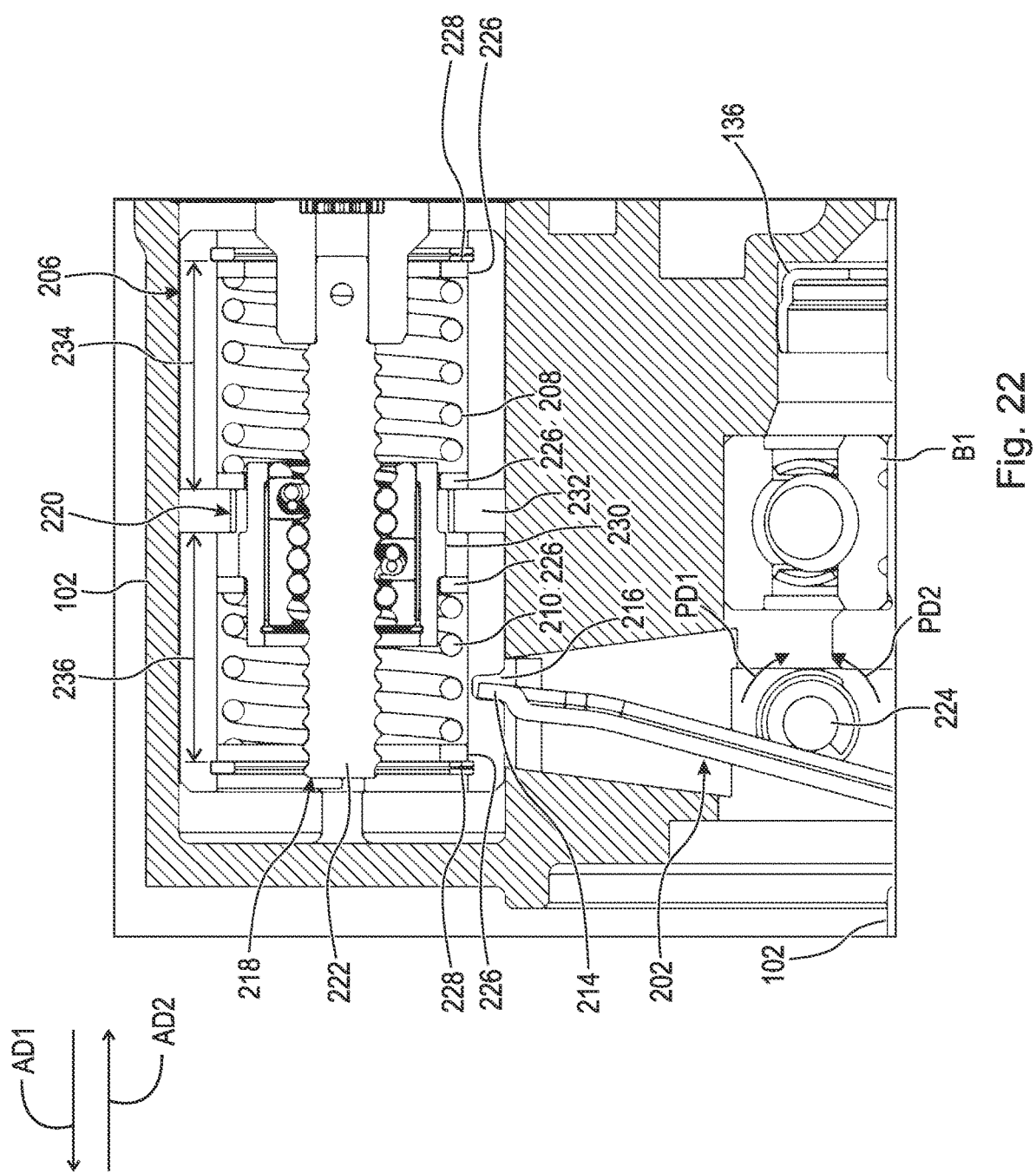
FIG. 22 is a detail of area 22 in FIG. 17.

FIG. 22 is a detail of area 22 in FIG. 17. The following should be viewed in light of FIGS. 1 through 22. To transition from the disconnect mode to the first blocked mode: actuator A is arranged to rotate shaft 222 to displace ball nut 220 in direction AD2; ball nut 220 is arranged to compress resilient element 208 in direction AD2 and reduce length 234; resilient element 210 is arranged to expand in direction AD2, increase length 236, and maintain contact with snap ring 228; resilient element 208 is arranged to displace drive housing 206 in direction AD2; drive housing 206 is arranged to pivot shift lever 202 in pivot direction PD1 around pins 224; shift lever 202 is arranged to displace sleeve 106 in axial direction AD1 and into contact with surfaces S of power output PO; drive housing 206 is arranged to continue compressing resilient element 208 until the first blocked mode is attained; and resilient element 210 is arranged to keep expanding until the first blocked mode is attained.

To transition from the first blocked mode to the connect mode: sleeve 106 and power output PO are arranged to rotate with respect to each other so that teeth 112 and teeth T are no long axially aligned, teeth 112 no longer contact surfaces 5, and teeth T axially align with indents 123; resilient element 208 is arranged to expand to increase length 234 and to displace drive housing 206, with respect to ball nut 220, in direction ADZ; drive housing 206 is arranged to compress resilient element 210 to reduce length 236, and to pivot shift lever 202 in direction PD1; and shift lever 202 is arranged to displace sleeve 106 in direction AD1 to mesh teeth 112 and teeth T. In the example of FIG. 19, assembly 200 is in a first connect mode in which shift lever 202 does not urge sleeve 106 in direction AD1. In the example of FIG. 20, assembly 200 is in a second connect mode in which shift lever 202 urges sleeve 106 in direction AD1.

To transition from the connect mode to the second blocked mode: actuator A is arranged to rotate shaft 222 to displace ball nut 220 in direction AD1; ball nut 220 is arranged to compress resilient element 210 in direction AD1 to reduce length 236; element 208 is arranged to expand to increase length 234 and maintain contact with snap ring 228; element 210 is arranged to displace drive housing 206 in direction AD1; drive housing 206 is arranged to urge pivot shift lever 202 in pivot direction PD2, opposite direction PD1 around pins 224; and shift lever 202 is arranged to urge sleeve 106 in direction AD2 with force F2.

To transition from the second blocked mode to the disconnect mode, force F1 is arranged to lessen to less than force F2, for example by reducing torque applied to one or both of sleeve 106 and power output PO; resilient element 210 is arranged to expand to increase length 236, and displace drive housing 206, with respect to ball nut 220 in direction AD1; drive housing 206 is arranged to compress element 208 to decrease length 234; drive housing 206 is arranged to pivot shift lever 202 in direction PD2; and shift lever 202 is arranged to displace sleeve 106 in direction AD2 to disengage sleeve 106 from power output PO.

In the example of FIG. 12: assembly 200 includes bearing B1, bearing B2, and end plate 136.

As described above, assembly 200 provides an expanded functionality by enabling transition from both the first blocked mode and the second blocked mode. For example: resilient element 208 expands and resilient element 210 compresses to pivot shift lever 202 and shift assembly 200 from the first blocked mode to the connect mode; and resilient element 210 expands and resilient element 208 compresses to pivot shift lever 202 and shift assembly 200 from the second blocked mode to the disconnect mode It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
AD1 axial direction
AD2 axial direction
AR axis of rotation
CD1 circumferential direction
CD2 circumferential direction
F1 force
F2 force
L line
P1 point, shift lever
P2 point, shift lever
PD1 pivot direction
PD2 pivot direction
PO power output
S surface, power output
T tooth, power output
100 axle disconnect
102 disconnect housing
104 main shaft
106 sleeve
108 resilient element/resilient shift lever
110 shift assembly
111 spline, main shaft
112 teeth, sleeve
114 drive housing
116 end, resilient element/shift lever
118 groove, sleeve
120 end, resilient element/shift lever
122 slot, drive housing
123 indent
124 shift component
126 ball nut
127 shaft, ball screw
128 lip, ball nut
129 slot, drive housing
130 pivot pin
132 surface, shift lever
134 gap
135 gap
136 end plate
200 axle disconnect
202 shift lever
204 shift assembly 205 drive housing
208 resilient element
210 resilient element
212 end, resilient element/shift lever
214 end, resilient element/shift lever
216 slot, sleeve
218 ball screw
220 ball nut
222 shaft, ball screw
224 pivot pin
226 cap
228 snap ring
230 lip, ball nut
232 lip, drive housing
234 length, resilient element 208
236 length, resilient element 210
238 length, resilient element 208
240 length, resilient element 210

The invention claimed is:

1. An axle disconnect assembly, comprising:
   a housing;
   a main shaft;
   a sleeve arranged to receive a rotational torque from a power output, the sleeve non-rotatably connected to the main shaft, axially displaceable with respect to the main shaft, and including a plurality of teeth;
   a shift assembly; and,
   at least one resilient element directly connected to the shift assembly, wherein in a first blocked mode, the plurality of teeth of the sleeve is arranged to contact the power output without meshing with a plurality of teeth of the power output, the shift assembly is arranged to deflect the at least one resilient element to at least one first shape, and the at least one resilient element is arranged to urge the sleeve against the power output; and wherein in a second blocked mode, the plurality of teeth of the sleeve is arranged to mesh with the plurality of teeth of the power output, a force is arranged to block disengagement of the sleeve from the power output, the shift assembly is arranged to deflect the at least one resilient element to at least one second shape different from the first shape, and the at least one resilient element is arranged to urge the sleeve away from the power output without displacing the sleeve.

2. The axle disconnect assembly of claim 1, wherein to transition from the first blocked mode to a connect mode of the axle disconnect assembly, one or both of the sleeve and the power output are arranged to rotate with respect to each other, and the at least one resilient element is arranged to un-deflect from the at least one first shape and displace the sleeve toward the power output to mesh the plurality of teeth of the sleeve with the plurality of teeth of the power output.

3. The axle disconnect assembly of claim 1, wherein to transition from the second blocked mode to a disconnect mode of the axle disconnect assembly, the force is arranged to diminish, the at least one resilient element is arranged to un-deflect from the at least one second shape, and the at least one resilient element is arranged to disengage the sleeve from the power output.

4. The axle disconnect assembly of claim 1, wherein in a connect mode of the axle disconnect assembly, the plurality of teeth of the sleeve is arranged to mesh with the plurality of teeth of the power output; wherein to transition from the connect mode to the second blocked mode, and the shift assembly is arranged to be displaced by the actuator; wherein in a disconnect mode of the axle disconnect assembly, the plurality of teeth of the sleeve is arranged to be free of contact with the power output; and wherein to transition from the disconnect mode to the first blocked mode, the shift assembly is arranged to be displaced by an actuator, the shift assembly is arranged to displace the at least one resilient element, and the at least one resilient element is arranged to displace the sleeve into contact with the power output.

5. The axle disconnect assembly of claim 1, wherein the at least one resilient element includes a resilient shift lever made of spring steel, and the shift assembly includes a drive housing arranged to be displaced by an actuator; wherein the resilient shift lever is pivotable with respect to the housing and includes a first end directly connected to the drive housing and a second end directly connected to the sleeve; and wherein the drive housing is arranged to bend the resilient shift lever in the first blocked mode and in the second blocked mode.

6. The axle disconnect assembly of claim 1, further comprising:
   a shift lever pivotable with respect to the housing and including a first end directly connected to the sleeve, and a second end; wherein the shift assembly includes a drive housing directly connected to the second end of the shift lever; wherein the shift assembly includes a shift component at least partly enclosed by the drive housing; wherein the at least one resilient element includes a first spring directly connected to the drive housing and the shift component, and a second spring directly connected to the drive housing and the shift component; and wherein in the first blocked mode, the shift component is arranged to deflect the at least one resilient element by compressing the first spring, the first spring is arranged to urge the drive housing in a first direction, and the drive housing is arranged to urge the shift lever in a first pivot direction around a pivot axis of the shift lever.

7. The axle disconnect assembly of claim 6, wherein in the second blocked mode, the shift component is arranged to deflect the at least one resilient element by compressing the second spring, the second spring is arranged to urge the drive housing in a second direction opposite the first direction, and the drive housing is arranged to urge the shift lever in a second pivot direction opposite the first pivot direction.

8. The axle disconnect assembly of claim 6, wherein to transition from the first blocked mode to a connect mode of the axle disconnect assembly, one or both of the sleeve and the power output are arranged to rotate with respect to each other, the first spring is arranged to expand and displace the drive housing in the first direction, and the drive housing is arranged to pivot the shift lever in the first pivot direction; and wherein to transition from the second blocked mode to a disconnect mode of the axle disconnect assembly, the force is arranged to lessen, the second spring is arranged to expand and displace the drive housing in a second direction opposite the first direction, and the drive housing is arranged to pivot the shift lever in a second pivot direction, opposite the first pivot direction.

9. An axle disconnect assembly, comprising:
   a housing;
   a main shaft at least partly enclosed by the housing;
   a sleeve arranged to receive rotational torque from a power output, the sleeve non-rotatably connected to the main shaft, axially displaceable with respect to the main shaft, and including a plurality of teeth;
   a shift assembly; and,
   a resilient shift lever made of a resilient material and including a first end directly connected to the sleeve and a second end directly connected to the shift assembly, wherein when the resilient material is deflected or bent from a free or unloaded state, the resilient material returns to the free state or unloaded state, without permanent deformation, when a load deflecting or bending the material is removed; wherein in a first blocked mode, the plurality of teeth is arranged to be in contact with the power output without meshing with a plurality of teeth of the power output, and the shift assembly is arranged to bend the resilient shift lever to a first shape; and wherein in a second blocked mode, the plurality of teeth of the sleeve is arranged to mesh with the plurality of teeth of the power output, a force is arranged to block disengagement of the sleeve from the power output, the shift assembly is arranged to bend the resilient shift lever to a second shape different from the first shape, and the resilient shift lever is arranged urge the sleeve away from the power output without displacing the sleeve.

10. The axle disconnect assembly of claim 9, wherein to transition from the first blocked mode to a connect mode of the axle disconnect assembly, one or both of the sleeve and the power output are arranged to rotate with respect to each other, the resilient shift lever is un-deflect from the first shape, and the resilient shift lever is arranged to displace the sleeve toward the power output to mesh the plurality of teeth of the sleeve with the plurality of teeth of the power output.

11. The axle disconnect assembly of claim 9, wherein to transition from the second blocked mode to a disconnect mode of the axle disconnect assembly, the force is arranged to lessen, and the resilient shift lever is arranged to un-deflect from the second shape and displace the sleeve away from the power output to disengage the plurality of teeth of the sleeve from the plurality of teeth of the power output.

12. The axle disconnect assembly of claim 9, wherein in a connect mode of the axle disconnect assembly, the plurality of teeth of the sleeve is arranged to mesh with the plurality of teeth of the power output; and wherein to transition from the connect mode to the second blocked mode, the shift assembly is arranged to be displaced by an actuator.

13. The axle disconnect assembly of claim 9, wherein in a disconnect mode of the axle disconnect assembly, the plurality of teeth of the sleeve is arranged to be free of contact with the power output; and wherein to transition from the disconnect mode to the first blocked mode, the shift assembly is arranged to be displaced by an actuator.

14. An axle disconnect assembly, comprising:
a housing;
a main shaft at least partly enclosed by the housing;
a sleeve arranged to receive rotational torque from a power output, the sleeve non-rotatably connected to the main shaft, axially displaceable with respect to the main shaft, and including a plurality of teeth;
a shift assembly including a first resilient element and a second resilient element; and,
a shift lever including a first end directly connected to the sleeve and a second end directly connected to the shift assembly, wherein in a first blocked mode, the plurality of teeth of the sleeve is arranged to be in contact with the power output without meshing with a plurality of teeth of the power output, the first resilient element is arranged to urge the shift lever in a first pivot direction with respect to the housing, and the shift lever is arranged to urge the sleeve against the power output; and wherein in a second blocked mode, the plurality of teeth of the sleeve is arranged to mesh with the plurality of teeth of the power output, a force is arranged to block disengagement of the sleeve from the power output, and the shift lever is arranged to urge the sleeve away the power output without displacing the sleeve.

15. The axle disconnect assembly of claim 14, wherein the shift assembly includes a drive housing directly connected to the first resilient element and to the second resilient element; wherein the shift assembly includes a shift component directly connected to the first resilient element and to the second resilient element; and wherein to transition from the first blocked mode to a connect mode of the axle disconnect assembly, one or both of the sleeve and the power output are arranged to rotate with respect to each other, the first resilient element is arranged to expand to displace the drive housing, the drive housing is arranged to pivot the shift lever, and the shift lever is arranged to displace the sleeve toward the power output to mesh the plurality of teeth of the sleeve with the plurality of teeth of the power output.

16. The axle disconnect assembly of claim 14, wherein the shift assembly includes a drive housing, directly connected to the first resilient element and to the second resilient element; wherein the shift assembly includes a shift component directly connected to the first resilient element and to the second resilient element; wherein in a connect mode of the axle disconnect assembly, the plurality of teeth of the sleeve is arranged to mesh with the plurality of teeth of the power output; and wherein to transition from the connect mode to the second blocked mode, the shift component is arranged to be displaced by an actuator, and the shift component is arranged to compress the second resilient element without displacing the sleeve.

17. The axle disconnect assembly of claim 14, wherein the shift assembly includes a drive housing, directly connected to the first resilient element and to the second resilient element; wherein the shift assembly includes a shift component directly connected to the first resilient element and to the second resilient element; and wherein to transition from the second blocked mode to a disconnect mode, the force is arranged to lessen, the second resilient element is arranged to expand to displace the drive housing, the drive housing is arranged to pivot the shift lever, and the shift lever is arranged to displace the sleeve away from the power output and disengage the sleeve from the power output.

18. The axle disconnect assembly of claim 14, wherein the shift assembly includes a drive housing, directly connected to the first resilient element and to the second resilient element; wherein the shift assembly includes a shift component directly connected to the first resilient element and to the second resilient element; wherein in a disconnect mode, the sleeve is free of contact with the power output; and wherein to transition from the disconnect mode to the first blocked mode, the shift component is arranged to be displaced by an actuator, the shift component is arranged to displace and compress the first resilient element, the first resilient element is arranged to pivot the shift lever in the first pivot direction, and the shift lever is arranged to displace the sleeve into contact with the power output.

19. The axle disconnect assembly of claim 14, wherein the shift assembly includes a drive housing, directly connected to the first resilient element and to the second resilient element; wherein the shift assembly includes a shift component directly connected to the first resilient element and to the second resilient element; wherein in a disconnect mode of the axle disconnect assembly, the plurality of teeth of the sleeve is arranged to be free of contact with the power output; and wherein to transition from the disconnect mode to the first blocked mode, the second resilient element is arranged to expand and maintain a direct connection with the drive housing and the shift component.

20. The axle disconnect assembly of claim 14, wherein the shift assembly includes a drive housing, directly connected to the first resilient element and to the second resilient element; wherein the shift assembly includes a shift component directly connected to the first resilient element and to the second resilient element; wherein in a connect mode of the axle disconnect assembly, the plurality of teeth of the sleeve is arranged to mesh with a plurality of teeth of the power output; and wherein to transition from the connect mode to the second blocked mode, the first resilient element is arranged to expand and maintain direct connection with the drive housing and the shift component.

* * * * *